US011978950B2

(12) United States Patent
Lee et al.

(10) Patent No.: US 11,978,950 B2
(45) Date of Patent: May 7, 2024

(54) ELECTRONIC DEVICE INCLUDING NOISE INDUCING STRUCTURE

(71) Applicant: Samsung Electronics Co., Ltd., Suwon-si (KR)

(72) Inventors: Haejin Lee, Suwon-si (KR); Min Park, Suwon-si (KR); Jinhwan Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 17/457,989

(22) Filed: Dec. 7, 2021

(65) Prior Publication Data

US 2022/0173500 A1 Jun. 2, 2022

Related U.S. Application Data

(63) Continuation of application No. PCT/KR2021/016324, filed on Nov. 10, 2021.

(30) Foreign Application Priority Data

Nov. 30, 2020 (KR) ........................ 10-2020-0164880

(51) Int. Cl.

*H01Q 1/52* (2006.01)
*H01Q 1/24* (2006.01)
*H01Q 1/02* (2006.01)

(52) U.S. Cl.

CPC ............... *H01Q 1/243* (2013.01); *H01Q 1/52* (2013.01); *H01Q 1/02* (2013.01)

(58) Field of Classification Search

CPC ................................ H01Q 1/243; H01Q 1/52
See application file for complete search history.

(56) References Cited

U.S. PATENT DOCUMENTS 10,477,675 B1 11/2019 Kim et al.
2013/0048347 A1 2/2013 Shiu et al.
(Continued)

FOREIGN PATENT DOCUMENTS

JP 2020-167667 10/2020
KR 10-2019-0073856 6/2019
(Continued)

OTHER PUBLICATIONS

Search Report and Written Opinion dated Feb. 15, 2022 in counterpart International Patent Application No. PCT/KR2021/016324.

*Primary Examiner* — Hasan Islam
(74) *Attorney, Agent, or Firm* — Nixon & Vanderhye, P.C.

(57) ABSTRACT

According to various embodiments, an electronic device includes: a housing including a conductive part; an antenna module, including a substrate including a first substrate surface, a second substrate surface facing a direction opposite a direction of the first substrate surface, and a substrate side surrounding a space between the first substrate surface and the second substrate surface, at least one antenna element disposed in the substrate, wireless communication circuitry disposed in the substrate and configured to transmit and/or receive a radio signal in the direction toward which the first substrate surface is directed through the at least one antenna element, a protection member disposed on the second substrate surface, and a conductive shield layer disposed on at least an external surface of the protection member, as an antenna module disposed in an internal space of the housing; a conductive member disposed in at least a part of the conductive part and having at least a partial area thereof facing at least a part of the conductive shield layer; and a noise induction layer disposed between the antenna module and the conductive member to form a capacitor structure having a specified capacitance value between the
(Continued)

conductive shield layer and the conductive member. Noise induced from the antenna module may be induced toward the conductive part through the capacitor structure.

20 Claims, 20 Drawing Sheets

(56) References Cited

U.S. PATENT DOCUMENTS

| | | | | |
|---|---|---|---|---|
| 2020/0044396 | A1* | 2/2020 | Ito | H01Q 1/243 |
| 2020/0227821 | A1* | 7/2020 | Wu | H01Q 1/38 |
| 2020/0321711 | A1 | 10/2020 | Baek et al. | |
| 2020/0329549 | A1 | 10/2020 | Seo et al. | |
| 2021/0249760 | A1 | 8/2021 | Kim et al. | |

FOREIGN PATENT DOCUMENTS

| | | |
|---|---|---|
| KR | 10-2019-0140244 | 12/2019 |
| KR | 10-2020-0121037 | 10/2020 |
| KR | 10-2021-0101091 | 8/2021 |

* cited by examiner

ELECTRONIC DEVICE INCLUDING NOISE INDUCING STRUCTURE

CROSS-REFERENCE TO RELATED APPLICATIONS

This application is a continuation of International Application No. PCT/KR2021/016324 designating the United States, filed on Nov. 10, 2021, in the Korean Intellectual Property Receiving Office and claiming priority to Korean Patent Application No. 10-2020-0164880, filed on Nov. 30, 2020, in the Korean Intellectual Property Office, the disclosures of which are incorporated by reference herein in their entireties.

BACKGROUND

Field

The disclosure relates to an electronic device including a noise induction structure

Description of Related Art

With the development of the wireless communication technology, an electronic device (e.g., an electronic device for communication) is generally used in everyday life, so the use of content is increasing exponentially. Due to the rapid growth in the use of content, a network capacity gradually reaches its limit. In order to satisfy the increasing need for radio data traffic after the commercialization of the $4^{th}$ generation (4G) communication system, a communication system (e.g., a $5^{th}$ generation (5G), a pre-5G communication system, or new radio (NR)) for transmitting and/or receiving signals using a frequency having a high frequency (e.g., mmWave) band (e.g., 3 GHz to 300 GHz bands) is researched.

In a next-generation wireless communication technology, signals may be transmitted and received using a frequency having a range of substantially 3 GHz to 100 GHz. In view of frequency characteristics, an mmWave antenna module is being developed as an efficient mounting structure for overcoming a high loss of a free space and increasing a gain of an antenna and a new antenna module for meeting the mounting structure. The mmWave antenna module may include an antenna module having an array form in which various numbers of antenna elements (e.g., conductive patches) are arranged at given intervals. Such antenna elements may be arranged so that beam patterns are formed in any one direction within an electronic device.

An electronic device may include a structure in which a local oscillator (LO) signal of an MHz unit along with an intermediate frequency (IF) signal of a GHz unit is applied to a mmWave antenna module as the corresponding module is added. For this reason, a flexible printed circuit board (FPCB) structure may be applied to the mmWave antenna module for a signal applied thereto. In view of characteristics of the FPCB structure, a surrounding system may be affected by a signal component of the FPCB structure applied thereto, or the FPCB structure may be exposed to a structure easy to be influenced by signal quality of the mmWave antenna module due to an unwanted signal (e.g., noise) induced from the existing antenna module (e.g., a legacy antenna module). Furthermore, radiation performance of a surrounding antenna module (e.g., a legacy antenna module) may be degraded due to an LO signal generated in the mmWave antenna module and static (e.g., noise) generated in a DC voltage supplier within the mmWave antenna module. Moreover, the mmWave antenna module may require a heat dissipation structure for discharging high-temperature heat occurring therein by transmitting and/or receiving high frequency signals.

SUMMARY

Embodiments of the disclosure may provide an electronic device including a noise induction structure for an antenna module.

Embodiments of the disclosure may provide an electronic device including a noise induction structure having a heat dissipation function for rapidly diffusing, to the surroundings, heat generated from an antenna module.

According to various example embodiments, an electronic device includes: a housing including a conductive part; an antenna module, including a substrate having a first substrate surface, a second substrate surface facing a direction opposite to a direction of the first substrate surface, and a substrate side surrounding a space between the first substrate surface and the second substrate surface, at least one antenna element disposed in the substrate, wireless communication circuitry disposed in the substrate and configured to transmit and/or receive a radio signal in the direction toward which the first substrate surface faces through the at least one antenna element, a protection member disposed on the second substrate surface, and a conductive shield layer disposed on at least an external surface of the protection member, as an antenna module disposed in an internal space of the housing; a conductive member disposed in at least a part of the conductive part and having at least a partial area thereof facing at least a part of the conductive shield layer; and a noise induction layer disposed between the antenna module and the conductive member to form a capacitor structure having a specified capacitance value between the conductive shield layer and the conductive member. Noise induced from the antenna module may be induced toward the conductive part through the capacitor structure.

According to various example embodiments, a noise induction structure (e.g., the noise induction layer) provided between the antenna module and the conductive member supporting the antenna module can help improving radiation performance of the antenna module by inducing noise, generated from the antenna module, toward the ground of a surrounding conductive structure (e.g., a conductive side member). Furthermore, various example embodiments may help an effective heat dissipation action of an electronic device by rapidly diffusing, to the surroundings, high-temperature heat generated from the antenna module through the thermal conductive material and/or the thermal conductive member included in the noise induction structure or disposed nearby.

In addition, various effects directly or indirectly checked through this document may be provided.

BRIEF DESCRIPTION OF THE DRAWINGS

In relation to the description of the drawings, the same or similar reference numerals may be used with respect to the same or similar elements.

The above and other aspects, features and advantages of certain embodiments of the present disclosure will be more apparent from the following detailed description, taken in conjunction with the accompanying drawings, in which.

DETAILED DESCRIPTION

Figure 1:
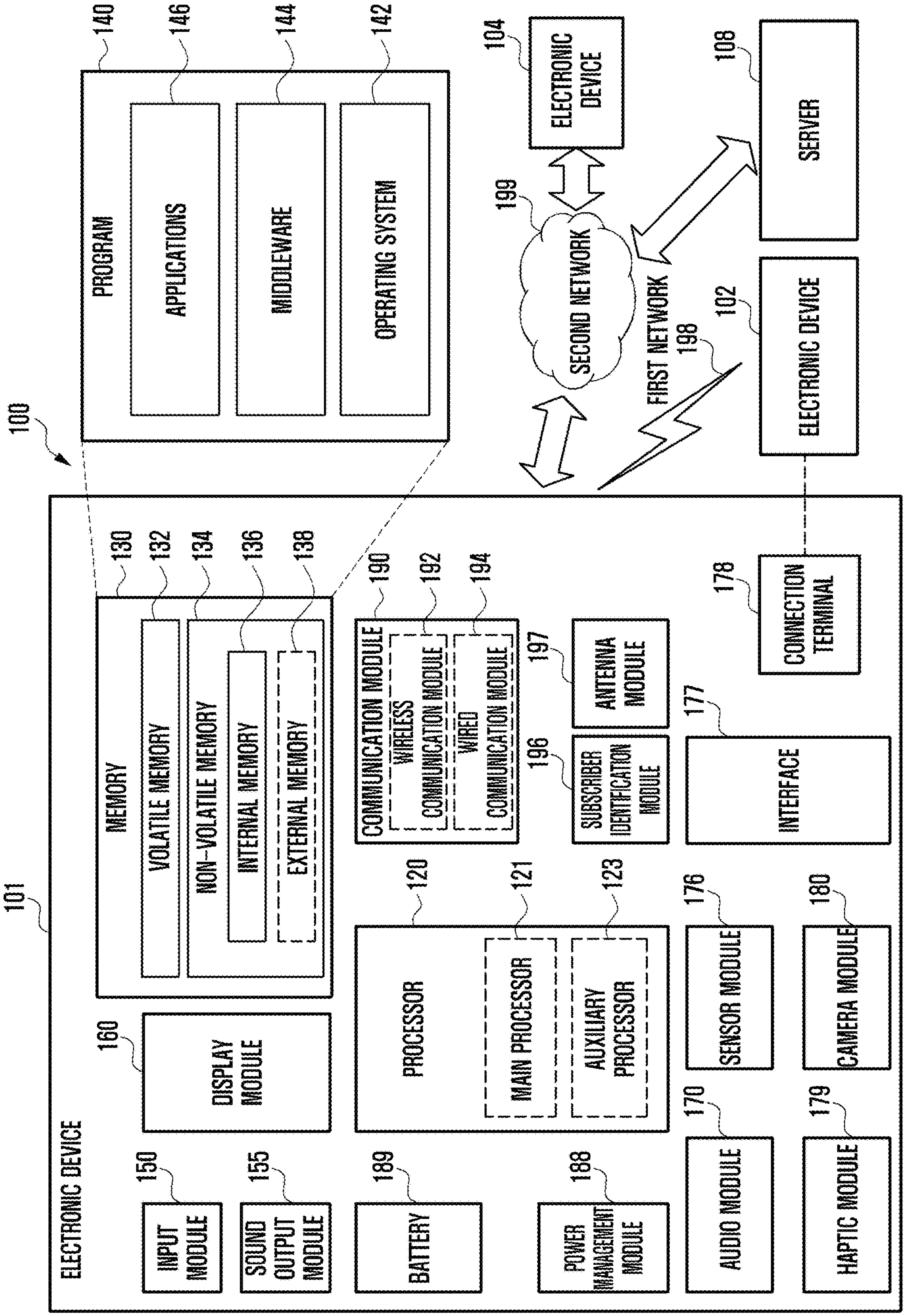
FIG. 1 is a block diagram of an example electronic device in a network environment according to various embodiments.

FIG. 1 illustrates an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
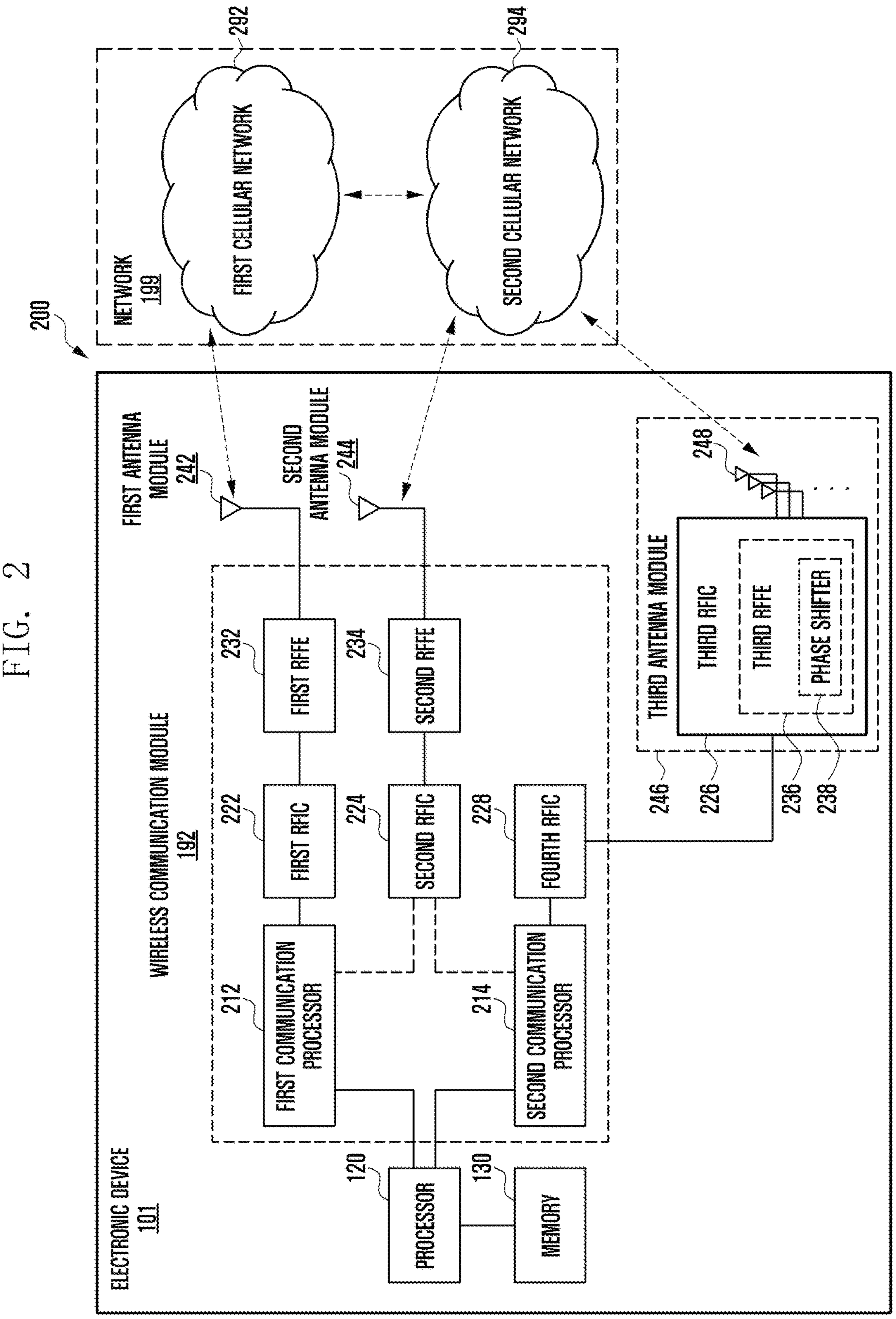
FIG. 2 is a block diagram illustrating an example configuration of an electronic device for supporting legacy network communication and 5G network communication according to various embodiments.

FIG. 2 is a block diagram illustrating an example configuration of an electronic device in a network environment including a plurality of cellular networks according to various embodiments.

Referring to FIG. 2, the electronic device 101 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

According to an embodiment, the antenna 248 may be include a plurality of antennas. The antenna may include, for example one or more of a patch antenna, a loop antenna or a dipole antenna. At least one of the plurality of antennas may include the patch antenna forming beam toward the rear portion of the electronic device 101 (e.g, −z axis direction of FIG. 3*b*). At least one of the plurality of antennas may include the loop antenna or dipole antenna forming beam toward the side portion of the electronic device 101 (e.g, −x axis direction of FIG. 3*a* and/or x axis direction of FIG. 3*b*).

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
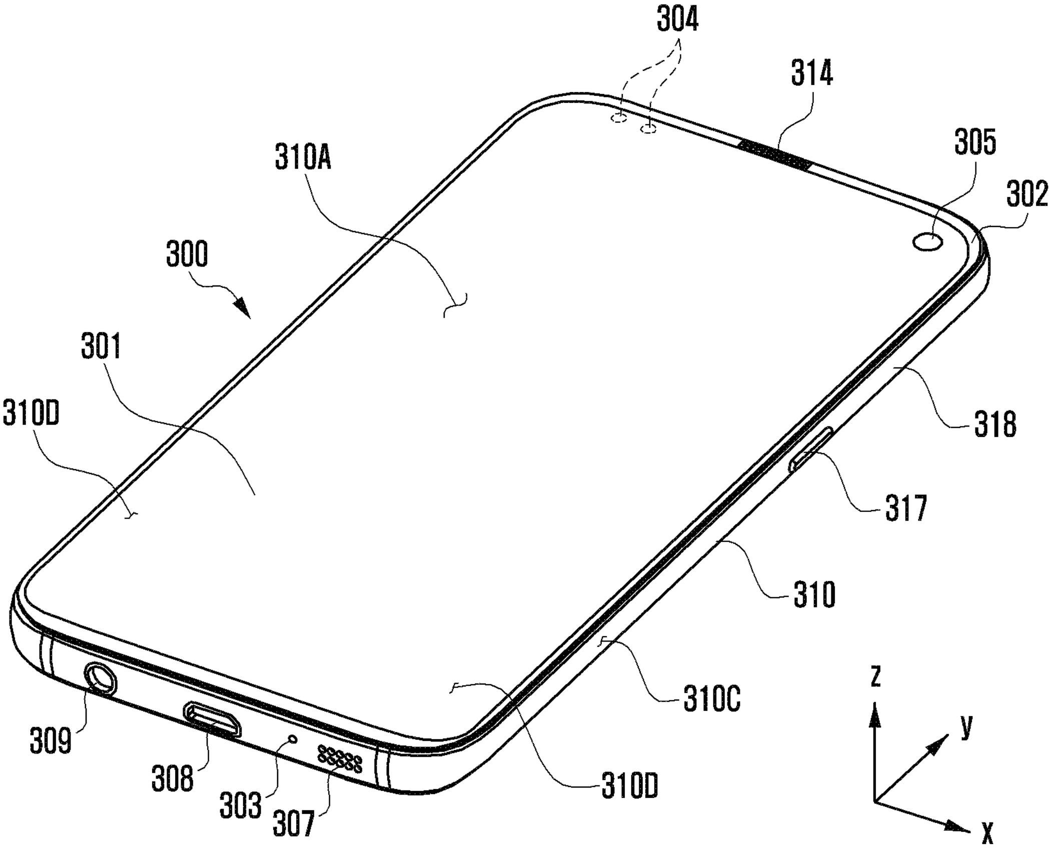
FIG. 3A is a front perspective view a mobile electronic device according to various embodiments.
Figure 3B:
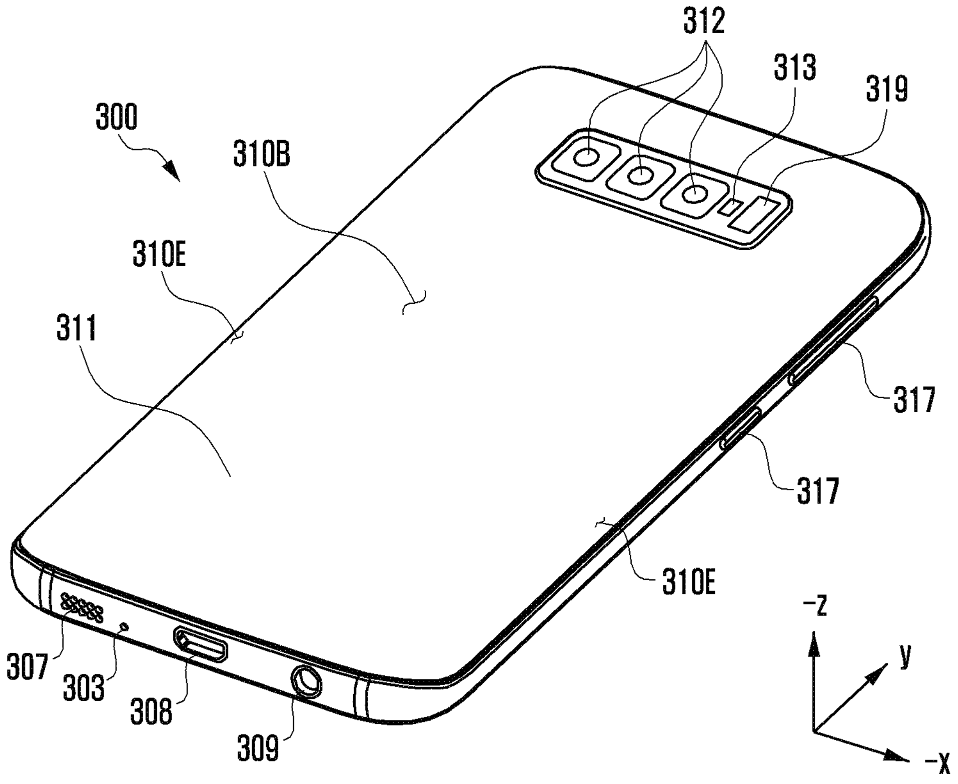
FIG. 3B is a rear perspective view of the mobile electronic device according to various embodiments.

FIG. 3A is a front perspective view of a mobile electronic device according to various embodiments, and FIG. 3B is a rear perspective view of the mobile electronic device shown in FIG. 3A according to various embodiments.

The electronic device 300 in FIGS. 3A and 3B may be at least partially similar to the electronic device 101 in FIG. 1 or may further include other embodiments.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be exposed through a substantial portion of the front plate 302, for example. At least a part of the display 301 may be exposed through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the exposed area of the display 301.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In an embodiment, some sensor modules 304 may be arranged to perform their functions without being visually exposed through the front plate 302 in the internal space of the electronic device. For example, in this case, an area of the display 301 facing the sensor module may not require a perforated opening. The camera module 305 may include, for example, under display camera (UDC).

According to an embodiment, an area corresponding to some camera module 305 of the display 301 is a part of an area in which content is displayed, and may be formed as a transmission area having designated transmittance. For example, the transmission area may be formed to have transmittance having a range of about 20% to about 40%. According to an embodiment, the transmission area may include an area overlapped with a valid area (e.g., a field of view (FOV)) of the camera module 305 through which light imaged by an image sensor (e.g., an image sensor of the camera module 305) and for generating an image passes. For example, a transmission area of the display 301 may include an area in which the density of pixels and/or a wiring density are lower than that of surroundings.

Figure 3C:
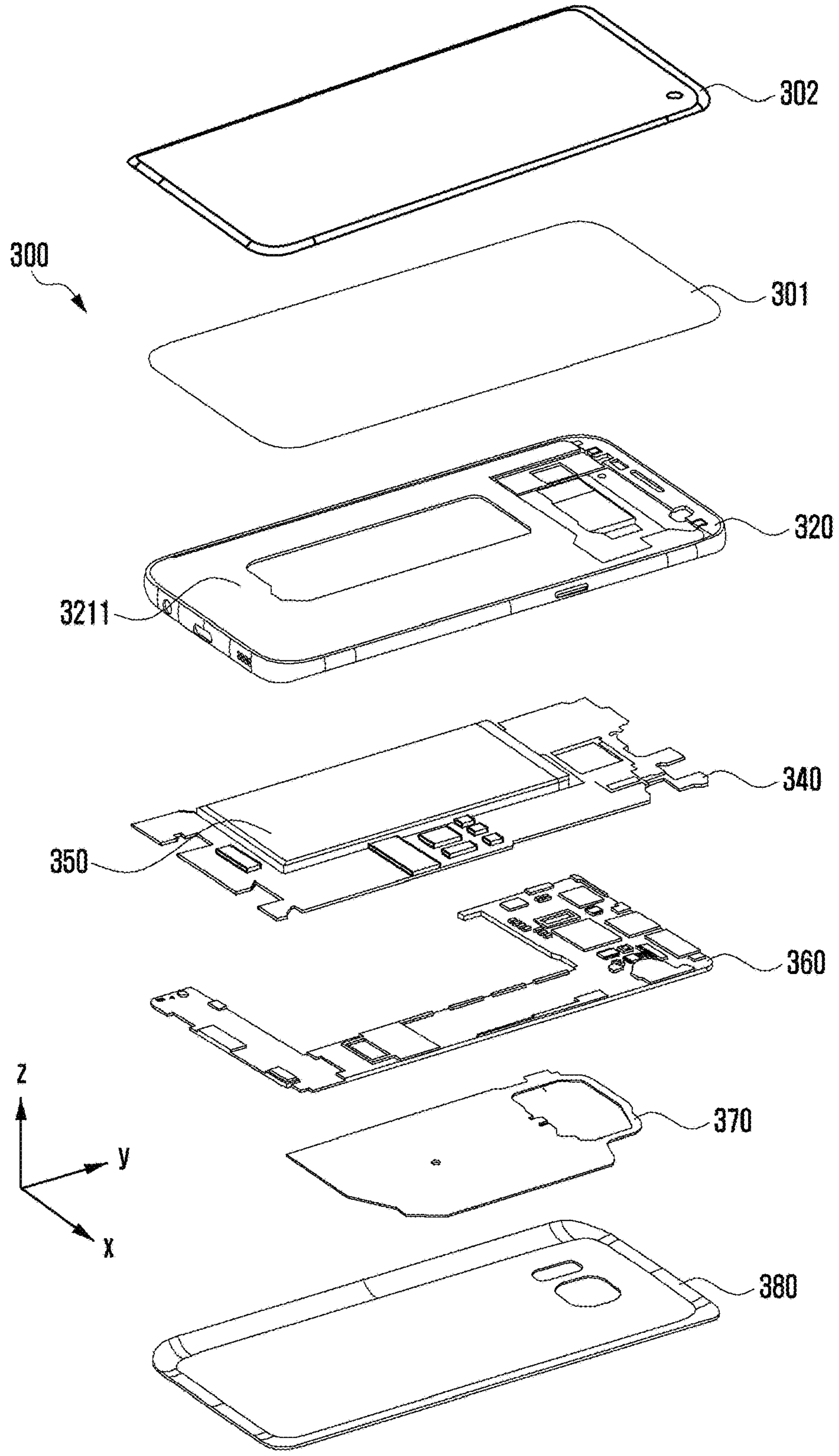
FIG. 3C is an exploded perspective view of the mobile electronic device according to various embodiments.

FIG. 3C is an exploded perspective view showing a mobile electronic device shown in FIG. 3A according to various embodiments.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 1 or FIG. 2, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

Figure 4A:
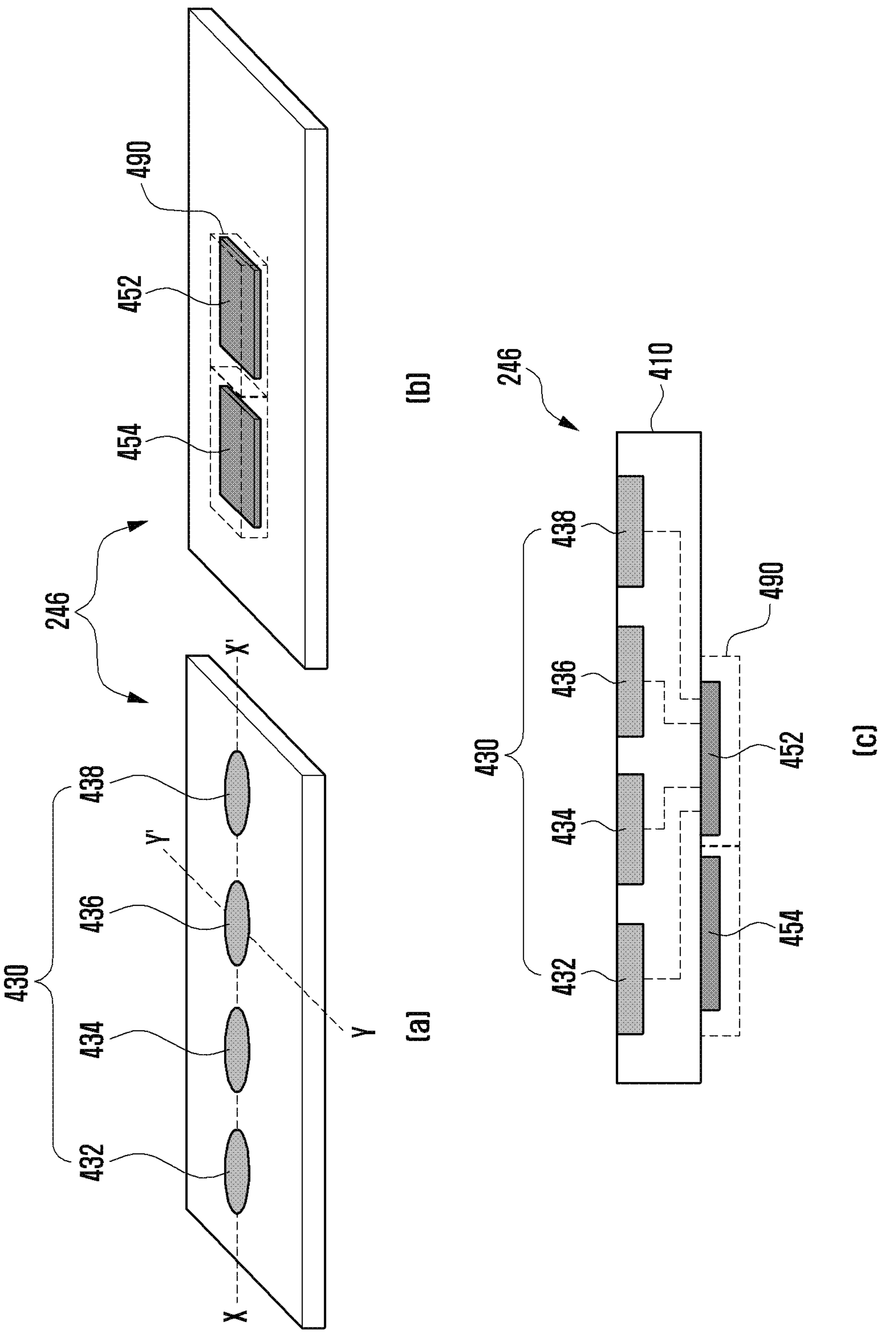
FIG. 4A is a diagram illustrating an example structure of a third antenna module described with reference to FIG. 2 according to various embodiments.

FIG. 4A is a diagram illustrating an example structure of, for example, a third antenna module described with reference to FIG. 2 according to various embodiments.

Referring to FIG. 4A(a) is a perspective view illustrating the third antenna module 246 viewed from one side, and FIG. 4A(b) is a perspective view illustrating the third antenna module 246 viewed from the other side. FIG. 4A(c) is a cross-sectional view illustrating the third antenna module 246 taken along line X-X' of FIG. 4A.

With reference to FIG. 4A, in an embodiment, the third antenna module 246 may include a printed circuit board 410, an antenna array 430, a RFIC 452, and a PMIC 454. Alternatively, the third antenna module 246 may further include a shield member 490. In other embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the printed circuit board 410. According to an embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to an embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to an embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 so as to electromagnetically shield at least one of the RFIC 452 or the PMIC 454. According to an embodiment, the shield member 490 may include a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
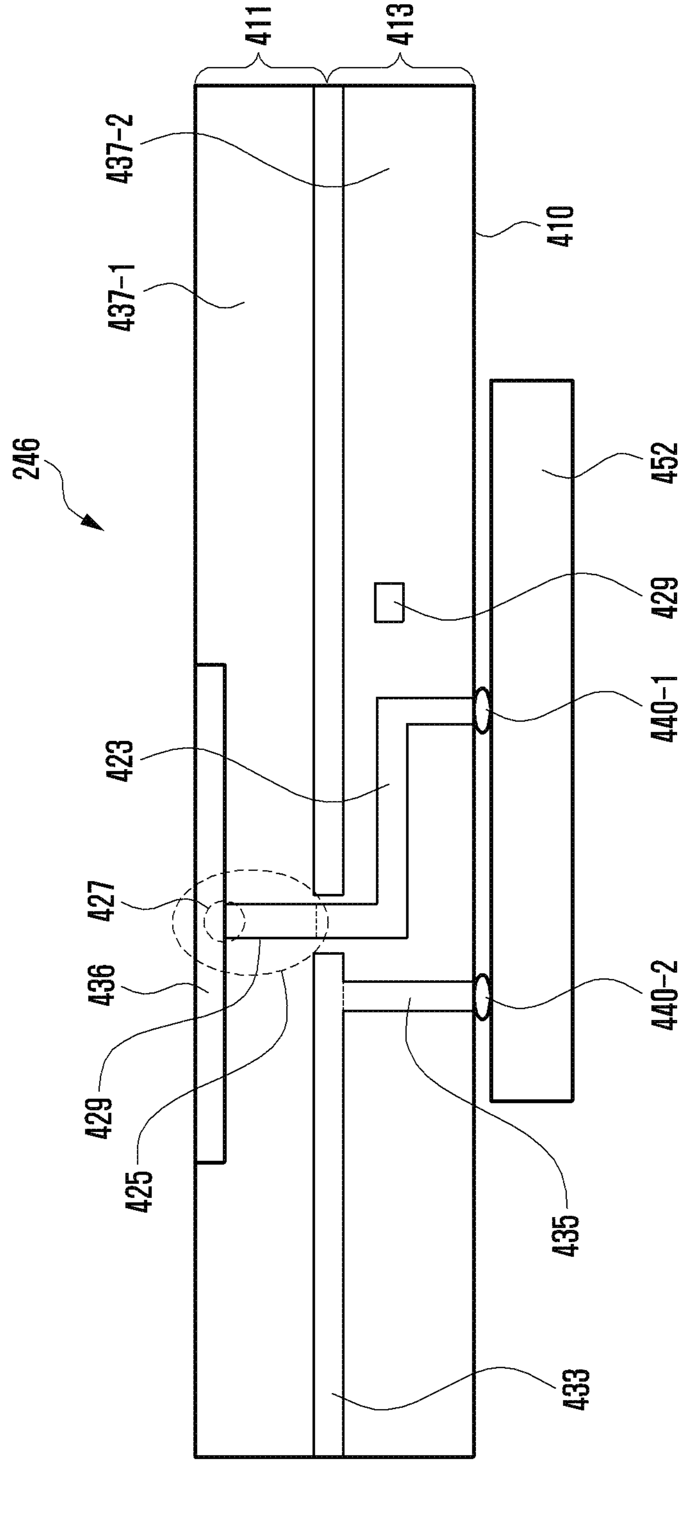
FIG. 4B is a cross sectional view taken along line Y-Y' of the third antenna module illustrated in (a) of FIG. 4A according to various embodiments.

FIG. 4B is a cross-sectional view illustrating the third antenna module 246 taken along line Y-Y' of FIG. 4A(a) according to various embodiments. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of FIG. 4A(c) may be electrically connected to the network layer 413 through, for example, first and second solder bumps 440-1 and 440-2. In other embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5A:
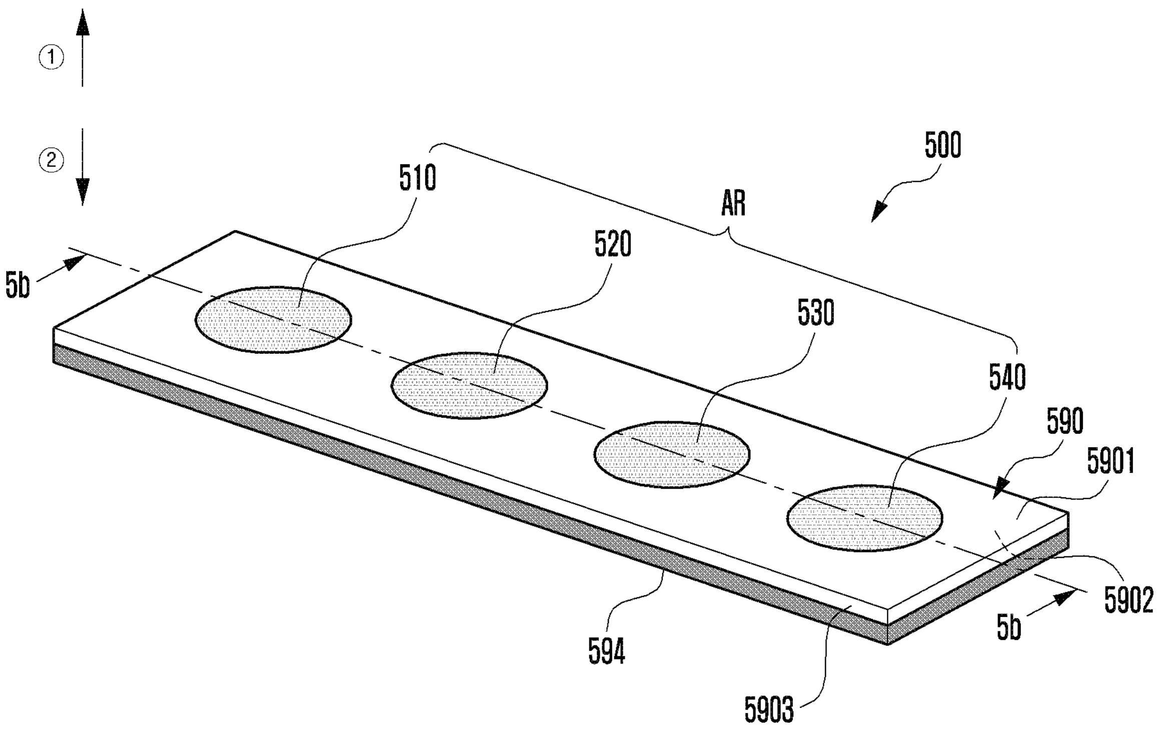
FIG. 5A is a perspective view of an antenna module according to various embodiments.
Figure 5B:
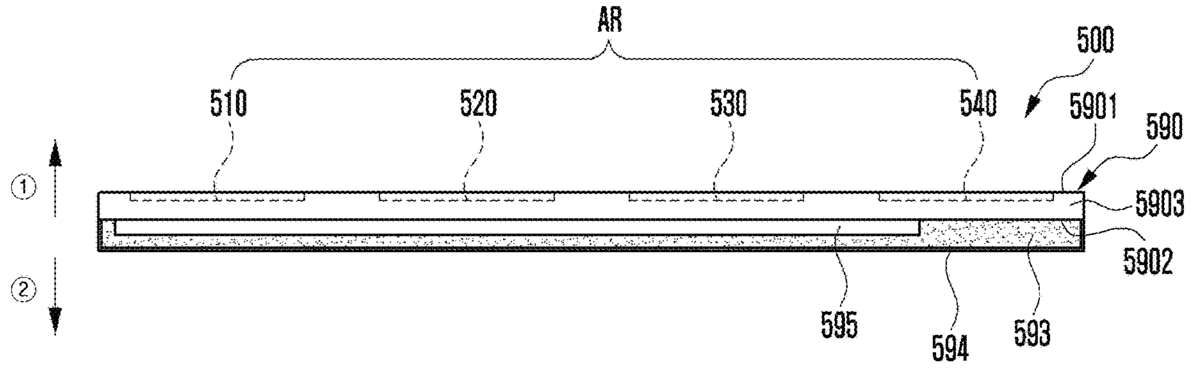
FIG. 5B is a cross-sectional view of the antenna module taken along line 5*b*-5*b* in FIG. 5A, according to various embodiments.

FIG. 5A is a perspective view of an antenna module 500 according to various embodiments. FIG. 5B is a cross-sectional view of the antenna module 500, taken along line 5*b*-5*b* in FIG. 5A, according to various embodiments.

The antenna module 500 in FIGS. 5A and 5B may be at least partially similar to the third antenna module 246 in FIG. 2 or may further include various embodiments.

Referring to FIGS. 5A and 5B, the antenna module 500 may include an antenna array AR including a plurality of conductive patches 510, 520, 530, and 540 as antenna elements. According to an embodiment, the plurality of conductive patches 510, 520, 530, and 540 may be disposed in a substrate 590 (e.g., a printed circuit board). According to an embodiment, the substrate 590 may include a first substrate surface 5901 facing a first direction (direction ①), a second substrate surface 5902 facing a direction (direction ②) opposite to the direction of the first substrate surface 5901, and a substrate side 5903 surrounding a space between the first substrate surface 5901 and the second substrate surface 5902. According to an embodiment, the antenna module 500 may include wireless communication circuitry 595 disposed on the second substrate surface 5902 of the substrate 590. According to an embodiment, the plurality of conductive patches 510, 520, 530, and 540 may be electrically connected to the wireless communication circuitry 595. According to an embodiment, the wireless communication circuitry 595 may be configured to transmit and/or receive radio frequencies having a range of about 3 GHz to 100 GHz through the antenna array AR.

According to various embodiments, the plurality of conductive patches 510, 520, 530, and 540 may include the first conductive patch 510, the second conductive patch 520, the third conductive patch 530 and/or the fourth conductive patch 540 disposed in the first substrate surface 5901 of the substrate 590 or an area close to the first substrate surface 5901 within the substrate 590 at designated intervals. The conductive patches 510, 520, 530, and 540 may have substantially the same shape. The antenna module 500 according to various embodiments has been illustrated and described with respect to the antenna array AR including the four conductive patches 510, 520, 530, and 540, but the present disclosure is not limited thereto. For example, the antenna module 500 may include one, two, or fifth or more conductive patches as the antenna array AR. In an embodiment, the antenna module may further include a plurality of conductive patterns (e.g., a dipole antenna) disposed on the substrate 590. In such a case, the conductive patterns may be disposed so that a beam pattern direction thereof is different from a beam pattern direction (e.g., a perpendicular direction) of the conductive patches 510, 520, 530, and 540.

According to various embodiments, the antenna module 500 may include a protection member 593 disposed on the second substrate surface 5902 of the substrate 590 and disposed to at least partially surround the wireless communication circuitry 595. According to an embodiment, the protection member 593 may include a protection layer disposed to surround the wireless communication circuitry 595, and may include a dielectric (e.g., dielectric material) hardened and/or solidified after being coated. According to an embodiment, the protection member 593 may include epoxy resin. According to an embodiment, the protection member 593 may be disposed to surround a part of or the entire wireless communication circuitry 595 in the second substrate surface 5902 of the substrate 590. According to an embodiment, the antenna module 500 may include a conductive shield layer 594 stacked at least on a surface of the protection member 593. According to an embodiment, the conductive shield layer (e.g., including a conductive material) 594 can shield noise (e.g., DC-DC noise or an interference frequency component), occurring in the antenna module 500, from diffusing to the surroundings. According to an embodiment, the conductive shield layer 594 may include a conductive material coated on a surface of the protection member 593 using a thin film deposition method, such as sputtering. According to an embodiment, the conductive shield layer 594 may be electrically connected to the ground of the substrate 590. In an embodiment, the conductive shield layer 594 may be disposed to extend up to at least a part of the substrate side 5903, including the protection member 593. In an embodiment, the protection member 593 and/or the conductive shield layer 594 may be substituted with a shield can mounted on the substrate.

The antenna module 500 operating in a relatively high frequency band may generate noise (e.g., DC-DC noise or an interference frequency component). Such noise is induced into a structure (e.g., a legacy antenna module or a display) disposed around the antenna module 500, and thus may cause performance degradation of the corresponding structure. Accordingly, a noise induction structure for inducing noise into a surrounding ground in addition to the conductive shield layer 594 may be additionally required. Moreover, the antenna module 500 in which relatively high-temperature heat occurs may require an improved heat dissipation structure.

Hereinafter, in various example embodiments, the antenna module 500 including an enhanced and improved noise induction structure and a heat dissipation structure and an electronic device including the antenna module 500 will be described.

Figure 6A:
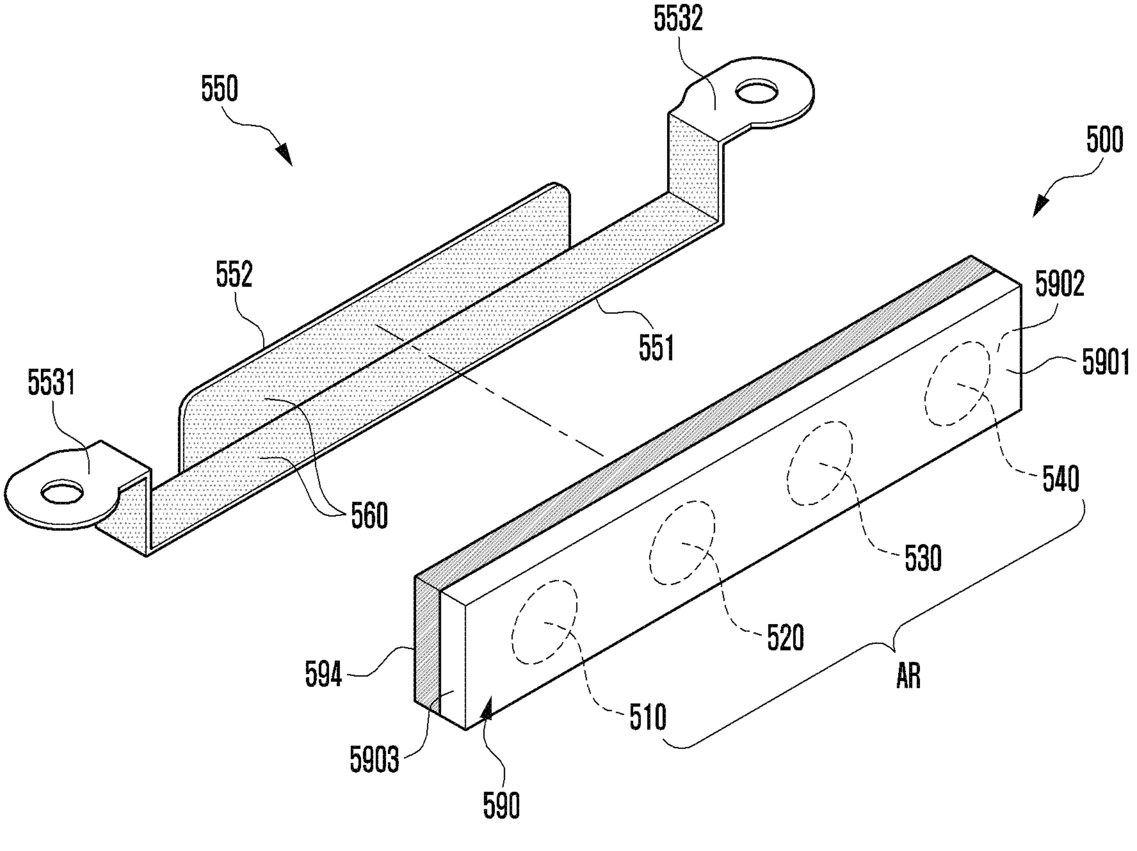
FIG. 6A is an exploded perspective view illustrating the state in which a conductive member has been applied to the antenna module according to various embodiments.
Figure 6B:
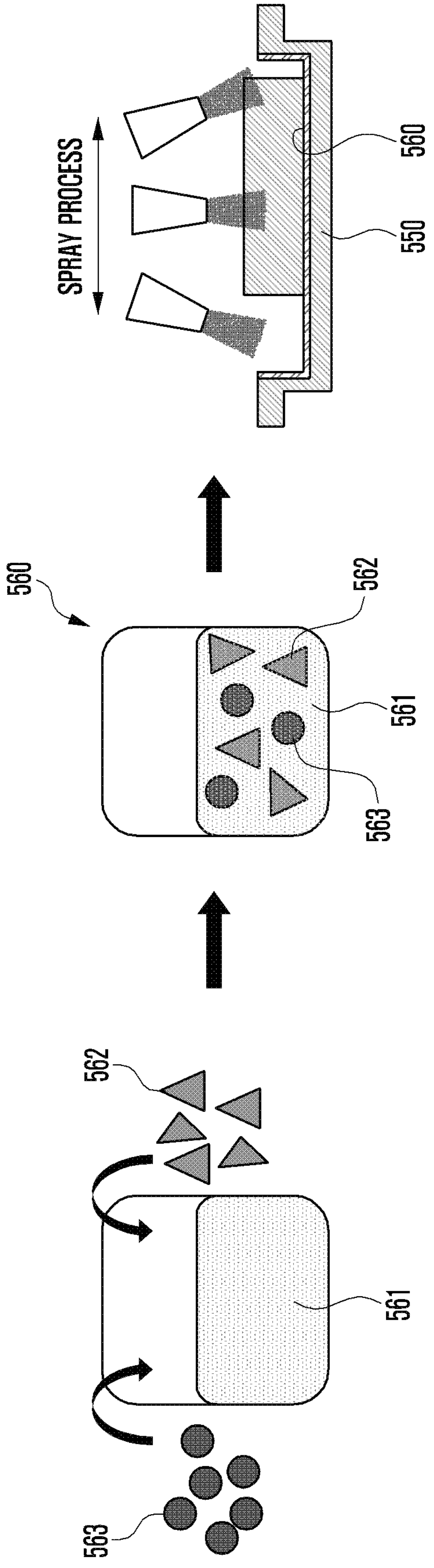
FIG. 6B is a diagram illustrating an example process of fabricating a noise induction layer according to various embodiments.

FIG. 6A is an exploded perspective view illustrating the state in which a conductive member has been applied to the antenna module according to various embodiments. FIG. 6B is a diagram illustrating an example process of fabricating a noise induction layer according to various embodiments.

With reference to FIG. 6A, an electronic device (e.g., an electronic device 700 in FIG. 7B) may include a conductive member fixed to a conductive part (e.g., a conductive part 721 in FIG. 7B) of a housing (e.g., a housing 710 in FIG. 7B), an antenna module at least partially fixed to the conductive member, and a noise induction layer 560 as a noise induction structure disposed between the antenna module and the conductive member. In an embodiment, the conductive member 550 may be fixed to the conductive part of a support member (e.g., a support member 711 in FIG. 7B). According to an embodiment, the conductive member 550 can help reinforcing the hardness (e.g., stiffness) of the antenna module 500 by being physically brought into contact with a conductive part (e.g., the conductive part 721 in FIG. 7B) of a side member (e.g., the side member 720 in FIG. 7B), and can effectively diffuse heat by transferring, to the conductive part 721 of the housing 710, heat generated from the antenna module 500. According to an embodiment, the conductive member 550 may be made of a material having tensile strength having a range of about 700 N/mm2 to about 800 N/mm2 for hardness reinforcement.

According to an embodiment, the conductive member 550 may be formed to have hardness having a range of about 210 Hv to about 245 Hv. According to an embodiment, the conductive member 550 may be made of a material having thermal conductivity of at least about 17 W/mK or more. In an embodiment, according to an embodiment, the conductive member 550 may be made of a material having thermal conductivity of at least about 200 W/mK or more. Accordingly, the conductive member 550 is made of a metal material, such as SUS, Cu or Al, thereby being capable of effectively transferring, to the outside, high-temperature heat emitted from the antenna module 500.

According to various embodiments, the conductive member 550 may include a first support 551 corresponding to at least a part of the substrate side 5903 of the substrate 590 and a second support 552 extended and bent from the first support 551 and corresponding to the second substrate surface 5902. According to an embodiment, the conductive member 550 may include at least one extension part 5531 and 5532 extended from both ends of the first support 551 and fixed to a conductive part (e.g., the conductive part 721 in FIG. 7B) and/or support member (e.g., the support member 711 in FIG. 7) of a housing (e.g., the housing 710 in FIG. 7). According to an embodiment, the at least one extension part 5531 and 5532 may be formed to extend in opposite directions in the first support 551 of the conductive member 550. In an embodiment, the at least one extension part 5531 and 5532 may be extended from the second support 552. For example, the antenna module 500 may be fixed to the conductive member 550 in a way that the substrate side 5903 is supported by the first support 551 and the second substrate surface 5902 is supported by the second support 552. According to an embodiment, the conductive member 500 to which the antenna module 500 is fixed may be fixed to a conductive part (e.g., the conductive part 721 in FIG. 7) and/or support member (e.g., the support member 711 in FIG. 7) of a housing (e.g., the housing 710 in FIG. 7) by a fastening member, such as a screw, through the at least one extension part 5531 and 5532.

According to various embodiments, an electronic device (e.g., the electronic device 700 in FIG. 7B) may include a noise induction layer 560 disposed between the conductive member 550 and the antenna module. According to an embodiment, the noise induction layer 560 may include a hardened dielectric layer after the dielectric layer is coated on the first support 551 and/or second support 552 of the conductive member 550 corresponding to the second substrate surface 5902 and/or substrate side 5903 of the substrate 590. According to an embodiment, the noise induction layer 560 may include a dielectric having a designated dielectric constant. According to an embodiment, the conductive member 550, the conductive shield layer 594, and the noise induction layer 560 disposed therebetween may be formed as a capacitor structure having a designated capacitance value. For example, the conductive member 550 and the conductive shield layer 594 may be connected to have an AC ground structure through a designated capacitance value. Accordingly, noise emitted in a relatively high frequency of the antenna module 500 may be induced into a conductive part (e.g., the conductive part 721 in FIG. 7B) of a housing (e.g., the housing 710 in FIG. 7B) electrically connected to the ground through the capacitor structure having a designated capacitance value. According to an embodiment, the conductive member 550 can prevent and/or reduce an electric shock problem because the conductive member 550 comes into contact with a conductive part (e.g., the conductive part 721 in FIG. 7B) of a housing (e.g., the housing 710 in FIG. 7B) through the capacitor structure disposed to have the AC ground structure. According to an embodiment, the noise induction layer 560 includes a thermal conductive material having a designated content, and thus can help improving a heat dissipation function by effectively transferring heat generated from the antenna module 500 to a conductive part (e.g., the conductive part 721 in FIG. 7B) of the housing 710 through the conductive member 550.

Referring to FIG. 6B, the noise induction layer 560 may be formed in a liquid form, and may be coated on a surface corresponding to the substrate 590 in the first support 551 and/or second support 552 of the conductive member 550. According to an embodiment, the noise induction layer 560 may be coated on the conductive member 550 using various methods, such as spraying, dispensing and/or painting, and may be hardened on the conductive member 550 through curing treatment (e.g., thermal curing treatment, ultraviolet curing treatment or natural hardening treatment). According to an embodiment, the noise induction layer 560 may be used as a dielectric layer of a capacitor structure having a designated capacitance value, wherein the conductive member 550 and the conductive shield layer 594 are used as opposite electrodes. According to an embodiment, the capacitance value may be determined based on a dielectric constant of the noise induction layer 560 (e.g., a dielectric layer). According to an embodiment, the dielectric constant of the noise induction layer 560 may include a high dielectric material 562 for having a capacitance value for inducing noise generated from a relatively high frequency of the antenna module 500. According to an embodiment, the noise induction layer 560 may include the high dielectric material 562 mixed with resin 561 (e.g., epoxy resin) as a binder with a designated content. According to an embodiment, the content of the high dielectric material 562 may have a range of about 30 wt % to about 70 wt % based on a total weight of the noise induction layer 560. According to an embodiment, the high dielectric material 562 may include at least one of barium titanate (BaTiO3), Pb-series perovskite or carbon black. According to an embodiment, the capacitor structure may be configured to have a designated capacitance value advantageous for noise induction through the adjustment of content of the high dielectric material 562. For example, the capacitance value of the noise induction layer 560 may be determined in a range of about 43 pF to about 57 pF through the adjustment of content of the high dielectric material 562. Furthermore, the noise induction layer 560 may be formed (e.g., by a coating method) in a liquid form (e.g., a grease type), and may have thermal conductivity of about 7 W/mK or more.

According to various embodiments, the noise induction layer 560 may further include a thermal conductive material 563 for effectively transferring, to the conductive member 550, heat generated from the antenna module 500. According to an embodiment, the high dielectric material 562 and the thermal conductive material 563 may be mixed at a ratio of about 6:1. According to an embodiment, the thermal conductive material 563 may include at least one of aluminum oxide ($Al_2O_3$), aluminum nitride (AlN), boron nitride (BN) or silicon carbide (SiC). For example, from Table 1 below, it may be seen that if 10% content of silicon carbide to a total of 60% content of the high dielectric material is mixed, a heat transfer characteristic is improved by about 0.8° C. from 58.1° C. to 58.9° C. Accordingly, the noise induction layer 560 in which the thermal conductive material is additionally mixed with the high dielectric material has a more improved heat dissipation function than the noise induction layer 560 in which only the high dielectric material is mixed.

TABLE 1

| | Sample | | | | |
|---|---|---|---|---|---|
| | Dielectric material 0% (only insulation) | Dielectric material 40% | Dielectric material 50% | Dielectric material 60% | Dielectric material 60% + SIC 10% |
| Painting thickness (μm) | 20 | 20 | 20 | 20 | 20 |
| Dielectric constant | 4.01 | 4.13 | 4.32 | 10.31 | 14.57 |
| Cp[pF] | 74.07 | 76.14 | 79.79 | 190.27 | 268.79 |
| Assuming loss of Cp[pF] 50% | 37.03 | 38.07 | 39.89 | 95.14 | 134.39 |
| Heat dissipation characteristic (70° C.) | Ch1 max. Temp 57.9 (±0.17) | Ch1 max. Temp 57.5 (±0.12) | Ch1 max. Temp 57.4 (±0.24) | Ch1 max. Temp 58.1 (±0.12) | Ch1 max. Temp 58.9 (±0.12) |

According to various embodiments, the noise induction layer 560 may be formed by performing a coating process multiple times in order to be uniformly distributed on the conductive member 550 to a designated thickness. Since the noise induction layer 560 is formed to have a withstand voltage of at least 350V dc through such multiple coating processes, an electric shock problem attributable to a leakage current can be prevented and/or reduced. According to an embodiment, the noise induction layer 560 may be formed to have a thickness of at least 20 μm (e.g., about 25 μm). According to an embodiment, the noise induction layer 560 may have hardness for preventing and/or reducing process failure, such as the peeling-off of a surface of painting which may occur when the antenna module 500 is fixed to the conductive member 550. For example, the noise induction layer 560 may be formed to satisfy a hardness characteristic of at least 4H. To this end, the noise induction layer 560 may include carbon black having a designated content as a high dielectric material. According to an embodiment, the noise induction layer 560 may be configured in a form in which the high dielectric material 562 and/or the thermal conductive material 563 having a powder form are stirred in the resin 561 having a liquid form.

Figure 7A:
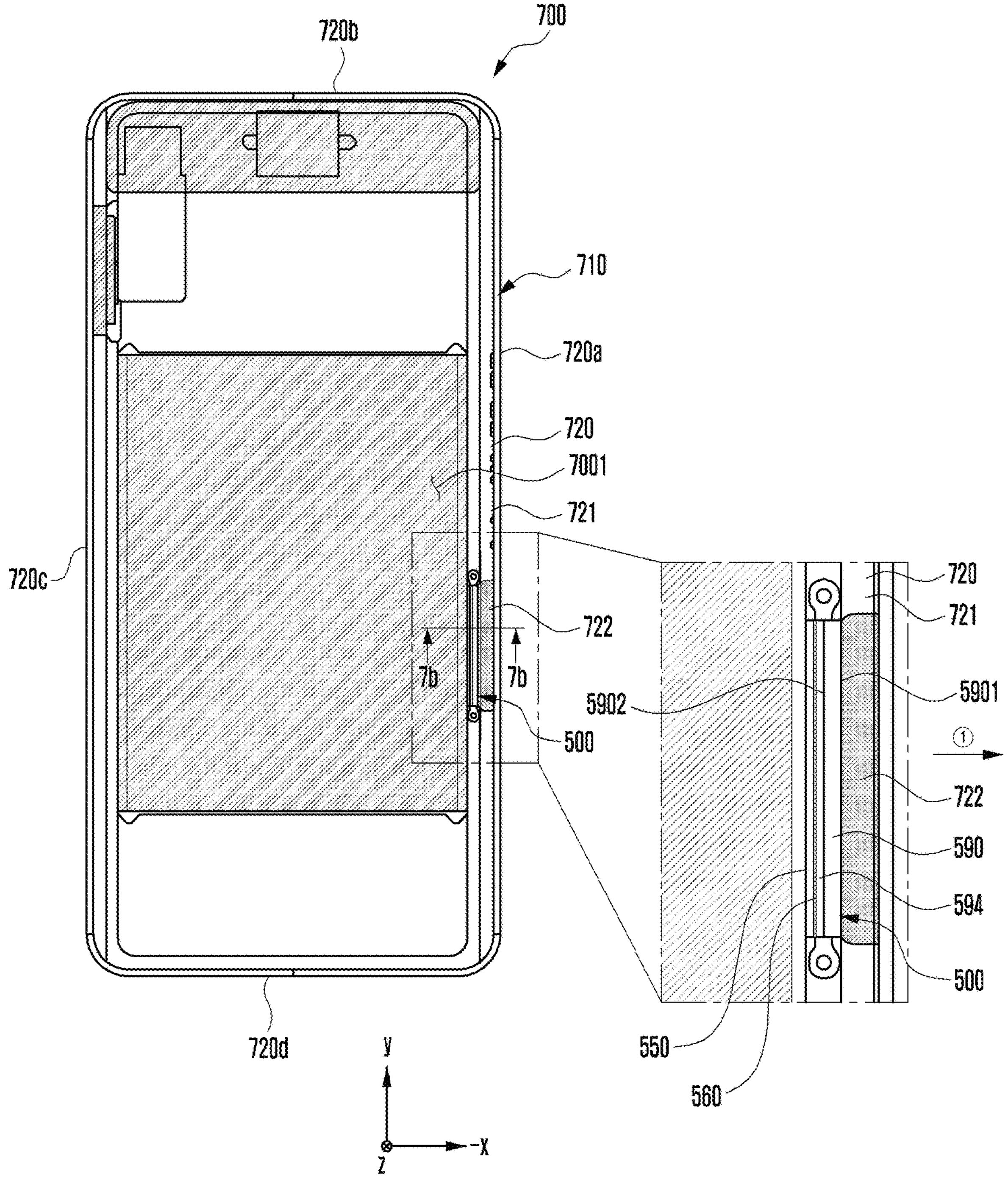
FIG. 7A is a diagram illustrating a part of an electronic device including an antenna module to which a conductive member has been applied according to various embodiments.
Figure 7B:
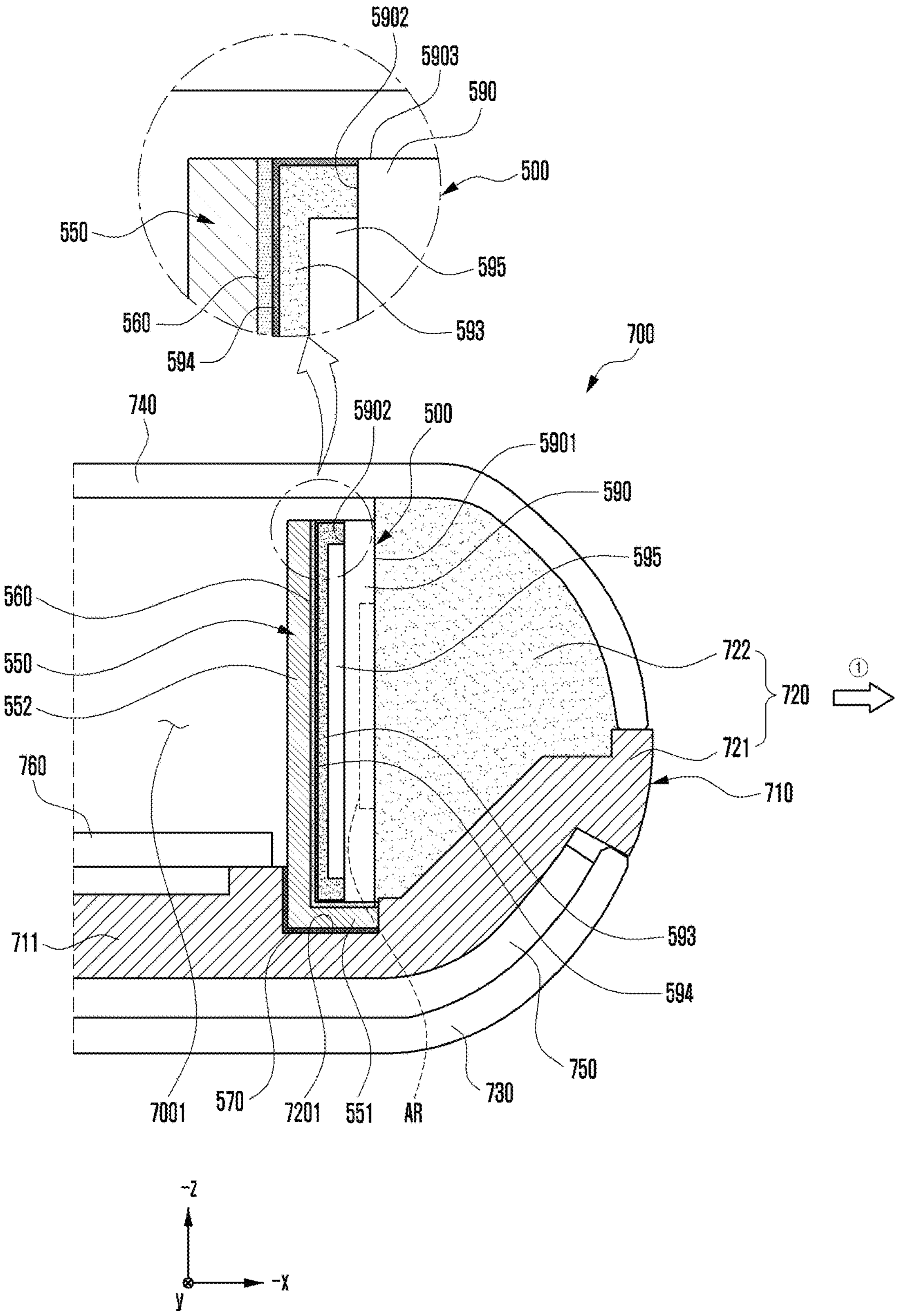
FIG. 7B is a cross-sectional view of a part of the electronic device, taken along line 7*b*-7*b* in FIG. 7A, according to various embodiments.

According to various embodiments, the noise induction layer 560 can reduce performance degradation of a surrounding electrical structure (e.g., a legacy antenna module) by inducing, into the ground, noise generated from the antenna module 500 through a conductive part (e.g., the conductive part 721 in FIG. 7B) of a housing (e.g., the housing 710 in FIG. 7B) and also help improving the heat dissipation function by rapidly diffusing, into a conductive part (e.g., the conductive part 721 in FIG. 7B) of a housing (e.g., the housing 710 in FIG. 7B, heat generated from the antenna module 500, by properly adjusting content of the high dielectric material 562 and content of the thermal conductive material 563 mixed with the resin 561.

Figure 6C:
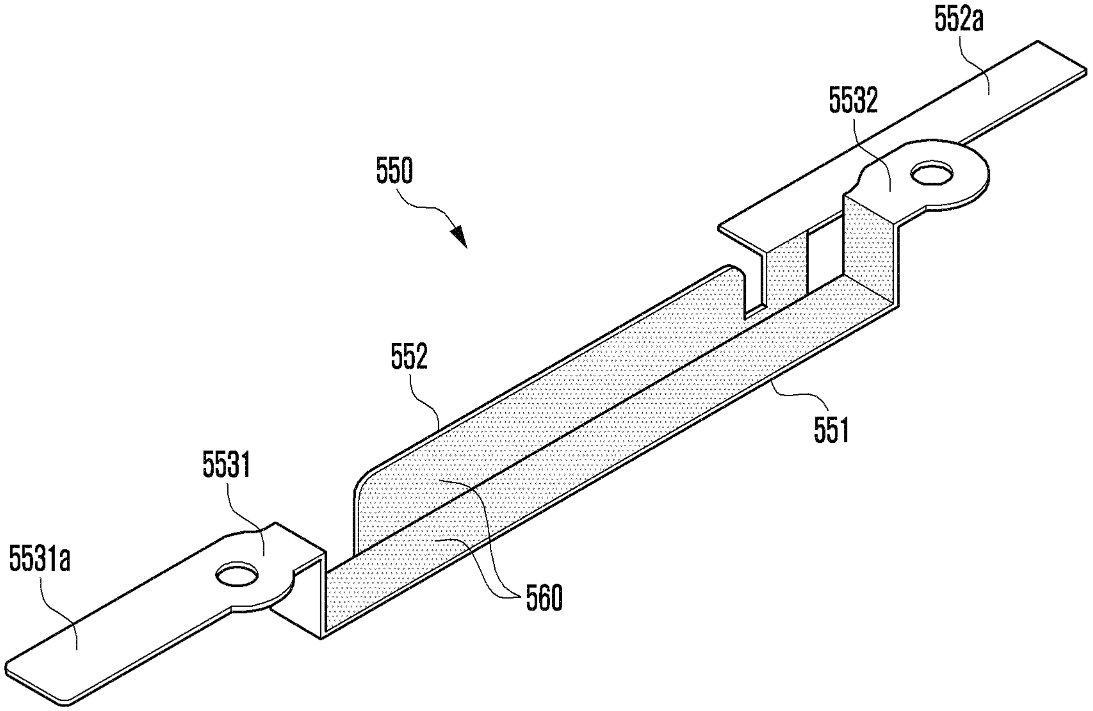
FIG. 6C is a perspective view of a conductive member according to various embodiments.

FIG. 6C is a perspective view illustrating an example conductive member according to various embodiments.

Substantially the same elements as those of the conductive member in FIG. 6A, among the elements of the conductive member in FIG. 6C, are assigned the same reference numerals, and a detailed description thereof may not be repeated here.

With reference to FIG. 6C, a conductive member 550 may include a first additional extension part **552*a* extended from the second support 552 to the outside and/or a second additional extension part 5531*a* extended from at least one extension part 5531 to the outside. According to an embodiment, the first additional extension part 552*a* and/or the second additional extension part 5531*a* may help diffusing heat generated from the antenna module 500** by being disposed in a way to be close to or come into contact with a thermal conductive structure (e.g., a conductive part of a side member or a ground layer of a substrate) disposed nearby.

FIG. 7A is a diagram illustrating a part of an electronic device including an antenna module to which a conductive member has been applied according to various embodiments. FIG. 7B is a cross-sectional view of a part of the electronic device, which is taken along line **7*b*-7*b* in FIG. 7**A, according to various embodiments.

An electronic device 700 of FIGS. 7A and 7B may be at least partially similar to the electronic device 101 of FIG. 1 or the electronic device 300 of FIGS. 3A to 3C, and may further include an embodiment of the electronic device.

Referring to FIGS. 7A and 7B, the electronic device 700 may include a housing 710, including a front plate 730 (e.g., a first plate) toward a first direction (e.g., a +z axis direction), a rear plate 740 (e.g., a second plate) toward a direction (e.g., a −z axis direction) opposite to the direction of the front plate 730, and a side member 720 surrounding a space 7001 between the front plate 730 and the rear plate 740. According to an embodiment, the side member 720 may include a first side 720*a* formed in a designated first direction (e.g., a y axis direction) and having a first length, a second side 720*b* extended from the first side 720*a* to a second direction (e.g., an X axis direction) substantially perpendicular to the first direction and having a second length shorter than the first length, a third side 720*c* extended substantially in parallel to the first side 720*a* from the second side 720*b* and having the first length, and a fourth side 720*d* extended substantially in parallel to the second side 720*b* from the third side 720*c* to the first side 720*a* and having the second length. According to an embodiment, the side member 720 may include a conductive part 721 that is at least partially disposed and a non-conductive part 722 (e.g., a polymer part) inserted into the conductive part 721 by injection. In an embodiment, the non-conductive part 722 may be substituted with a space or another dielectric. In an embodiment, the non-conductive part 722 may be structurally coupled to the conductive part 721. According to an embodiment, the side member 720 may include the support member 711 (e.g., the first support member 3211 in FIG. 3C) extended from the side member 720 to at least a part of an internal space 7001. According to an embodiment, the support member 711 may be extended from the side member 720 to the internal space 7001 or may be formed by structural coupling with the side member 720. According to an embodiment, the support member 711 may be extended from the conductive part 721. According to an embodiment, the support member 711 may support at least a part of the antenna module 500 disposed in the internal space 7001. According to an embodiment, the support member 711 may be disposed to support at least a part of a display 750. According to an embodiment, the display 750 may be disposed in a way to be seen to the outside through at least a part of the front plate 730.

According to various embodiments, the antenna module 500 may be disposed so that the antenna array AR including conductive patches (e.g., the conductive patches 510, 520, 530, and 540 in FIG. 5A) forms a beam pattern in a direction toward which the side member 720 is substantially directed. In such a case, the beam pattern of the antenna module 500 may be formed through the non-conductive part 722 of the side member 720. According to an embodiment, the antenna module 500 may be disposed so that the first substrate surface 5901 of the substrate 590 corresponds to the side member 720. According to an embodiment, the antenna module 500 may be disposed to be directed toward the side member 720 and/or the side member 720 through the conductive member 550 disposed in a module mounting part 7201 provided in at least a part of the side member 720 and the support member 711. In an embodiment, the antenna module 500 may be disposed substantially perpendicular to the front plate 730 so that the first substrate surface 5901 of the substrate 590 corresponds to the side member 720, and may be set so that a beam pattern is formed toward a direction (the direction ①) toward which the side member 720 is directed, a space between the side member 720 and the front plate 730, a direction toward which the front plate 730 is directed, a space between the side member 720 and the rear plate 740 and/or a direction toward which the rear plate 740 is directed. According to an embodiment, the electronic device 700 may include another substrate 760 (e.g., a main substrate or a primary substrate) disposed in the internal space 7001. According to an embodiment, although not illustrated, the antenna module 500 may be electrically connected to the other substrate 760 through an electrical connection member (e.g., an FPCB connector).

According to various embodiments, the electronic device 700 may include the conductive member 550 supporting at least a part of the antenna module 500 and disposed in the module mounting part 7201 of the housing 710. According to an embodiment, the antenna module 500 may be disposed so that at least a part of the substrate side 5903 of the substrate 590 is supported by the first support 551 of the conductive member 550 and the second substrate surface 5902 of the substrate 590 is supported by the second support 552 of the conductive member 550. In an embodiment, the conductive member 550 may be formed in a form of the antenna module 500 or in various forms depending on a mounting structure mounted on the side member 720. For example, the second support 552 of the conductive member 550 is disposed in a way that the entire area of the second support 552 is substantially supported through a conductive barrier rib elongated from the conductive part 721 of the side member 720 to the internal space 7001, thus being capable of receiving help of thermal transfer. According to an embodiment, the conductive member 550 may be fixed to the housing 710 in a way to be fastened through a screw. In an embodiment, the conductive member 550 may be fixed to the housing 710 through welding, soldering, conductive bonding or structural coupling.

According to various embodiments, the antenna module 500 may be disposed so that the conductive shield layer 594 corresponds to the conductive member 550. In such a case, the electronic device 700 may include the noise induction layer 560 disposed between the conductive shield layer 594 and the conductive member 550. According to an embodiment, the noise induction layer 560 may include a hardened dielectric layer having a designated thickness and a dielectric constant after being coating on the first support 551 and/or second support 552 of the conductive member 550 in a liquid form. According to an embodiment, the electronic device 700 may have a capacitor structure through the noise induction layer 560, and the conductive member 550 and the conductive shield layer 594 disposed on both sides of the noise induction layer 560 and functioning as an electrode. According to an embodiment, the noise induction layer 560 includes a high dielectric material (e.g., the high dielectric material 562 in FIG. 6B), and can reduce performance degradation of a surrounding electrical structure attributable to noise and prevent and/or reduce an electric shock problem occurring because the conductive member 550 physically comes into contact with the conductive part 721 by inducing, into the ground, noise induced from the antenna module 500 through the conductive part 721 of the housing 710 because the conductive member 550 and the conductive shield layer 594 of the antenna module 500 are connected as an AC ground structure having a designated capacitance value. Furthermore, the noise induction layer 560 includes a thermal conductive material (e.g., the thermal conductive material 563 in FIG. 6B) having a designated content in addition to the high dielectric material 562, and can help improving a heat dissipation function by rapidly diffusing, into the conductive part 721 of the housing 710, heat generated from the antenna module 500.

According to various embodiments, the electronic device 700 may include a thermal conduction member 570 disposed between the conductive member 550 and the conductive part 721 of the side member 720. For example, if the thermal conduction member 570 is elongated from the conductive part 721 to the internal space 7001 in a way to support substantially the entire second support 552 of the conductive member 550, the thermal conduction member 570 may be disposed in a form corresponding to such elongation. According to an embodiment, the thermal conduction member 570 may include a thermal interface material (TIM), and may induce effective heat dissipation by transferring, to the conductive part 721 of the side member 720 and/or the support member 711, heat transferred from the antenna module 500 to the conductive member 550.

Figure 8A:
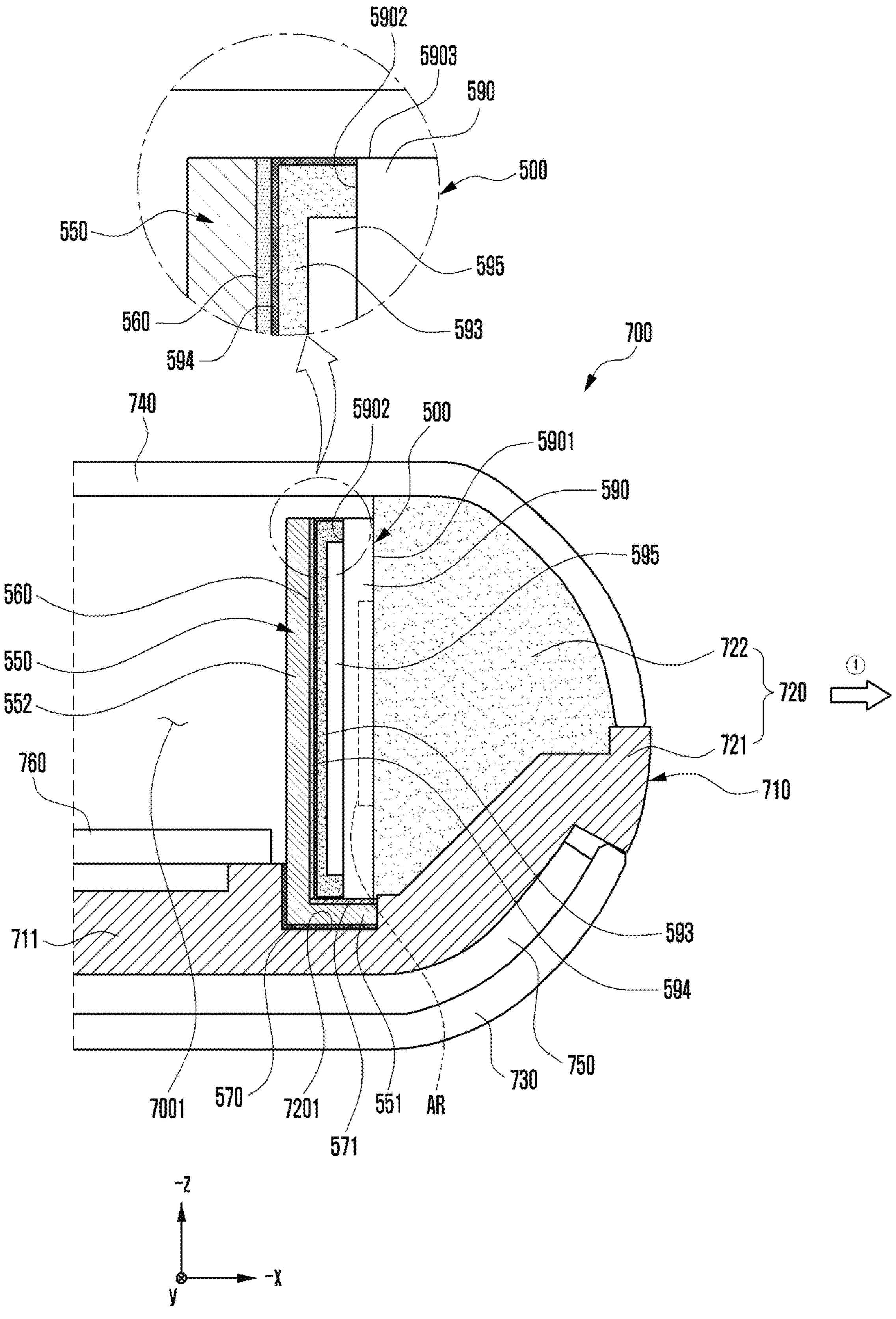
FIG. 8A is a cross-sectional view of a part of an electronic device including a noise induction layer and an insulating member according to various embodiments.
Figure 8B:
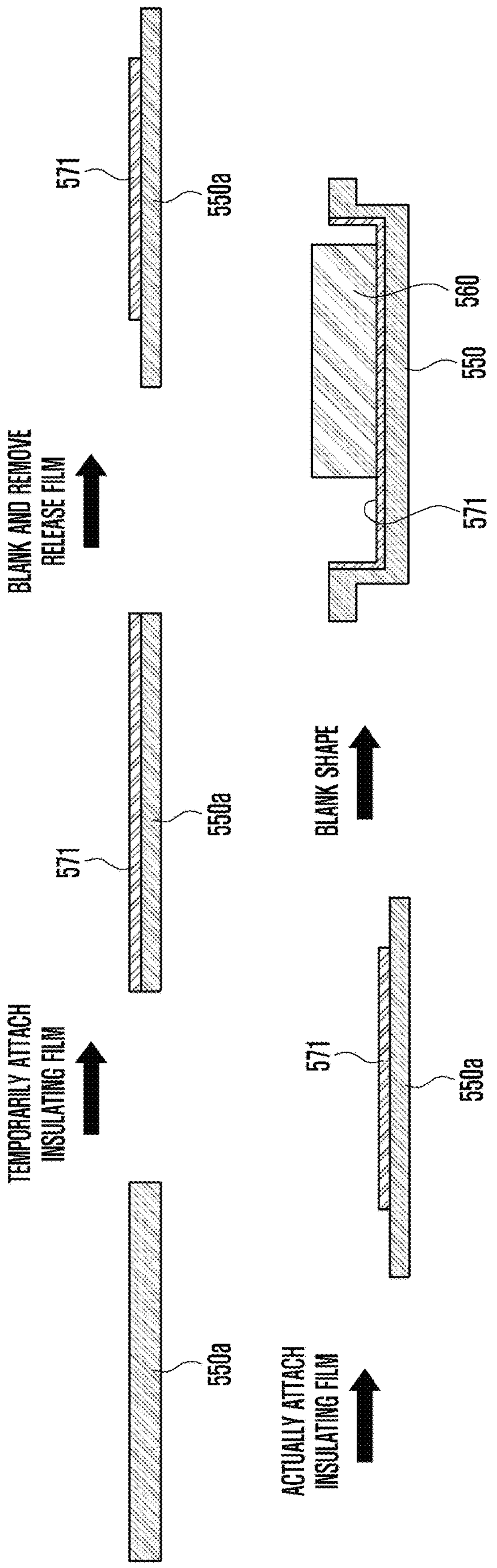
FIG. 8B is a diagram illustrating an example process of fabricating a conductive member to which the insulating member has been applied according to various embodiments.

FIG. 8A is a cross-sectional view of a part of an electronic device including a noise induction layer and an insulating member according to various embodiments. FIG. 8B is a diagram illustrating an example process of fabricating a conductive member to which the insulating member has been applied according to various embodiments.

In describing an electronic device 700 of FIG. 8A, substantially the same elements as those of the electronic device 700 of FIGS. 7A and 7B are assigned the same reference numerals, and a detailed description thereof may not be repeated here.

With reference to FIG. 8A, the electronic device 700 may include a noise induction layer 560 disposed between an antenna module 500 and a conductive member 550. The noise induction layer 560 according to an embodiment may be partially disposed between the antenna module 500 and the conductive member 550. In such a case, an electric shock problem can be prevented and/or reduced because an insulating member 571 is disposed in a part in which the noise induction layer 560 is not disposed. For example, the electronic device 700 may include the noise induction layer 560 disposed between a second support 552 of the conductive member 550 and the antenna module 500, and the insulating member 571 disposed between a first support 551 of the conductive member 550 and the antenna module 500. According to an embodiment, the insulating member 571 may be formed to have a withstand voltage characteristic for preventing and/or reducing a leakage current and to have a hardness characteristic for preventing and/or reducing damage when the antenna module 500 is assembled. For example, the insulating member 571 is an insulating laminating film member attached to the first support 551 of the conductive member 550, and may be formed to have a withstand voltage characteristic of at least 350 V dc and/or a hardness characteristic of at least 2H or more.

FIG. 8B is a diagram illustrating an example process of attaching, to the conductive member 550, the insulating film 571 (e.g., an insulating tape) as an insulating member according to various embodiments. A metal base material **550*a* for fabricating the conductive member 550 may be prepared. Thereafter, the insulating film 571 may be temporarily attached to the metal base material 550*a* using a laminating method. In such a case, a state of one surface of the insulating film 571 may be a state in which the one surface of the insulating film 571 has been attached through release paper. Thereafter, a part of the insulating film 571 that does not require insulation may be blanked in accordance with a shape of the conductive member 550, and the release film may be removed from the insulating film 571. Thereafter, the insulating film 571 may be completely attached to the metal base material 550*a* through real attachment. The metal base material 550*a* may be processed in accordance with a shape of the conductive member 550. For example, a process of processing the metal base material 550*a*** may include a press process.

According to various embodiments, the noise induction layer 560 may be partially disposed between the conductive member 550 and the antenna module 500, and the insulating member 571 is disposed in a port vulnerable to a leakage current. Accordingly, noise generated from the antenna module 500 can be induced to the ground of the electronic device 700 through the noise induction layer 560, and a leakage current can be blocked through the insulating member 571.

Figure 9:
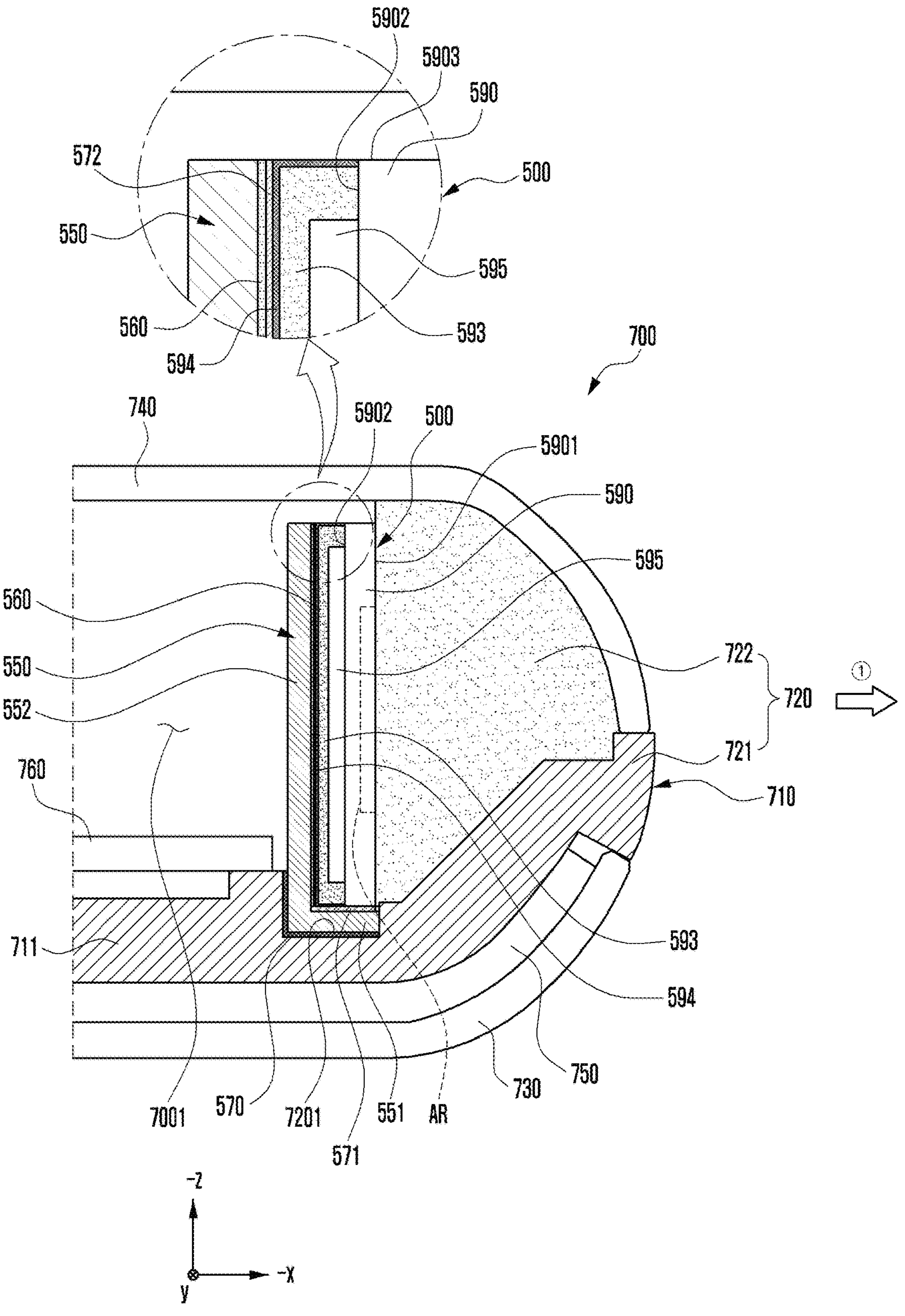
FIG. 9 is a cross-sectional view of a part of an electronic device including a thermal conductive member disposed between a noise induction layer and a conductive shield layer according to various embodiments.

FIG. 9 is a cross-sectional view of a part of an electronic device including a thermal conductive member disposed between a noise induction layer and a conductive shield layer according to various embodiments.

In describing an electronic device 700 of FIG. 9, substantially the same elements as those of the electronic device 700 of FIG. 8A are assigned the same reference numerals, and a detailed description thereof may not be repeated here.

Referring to FIG. 9, the electronic device 700 may further include a thermal conduction member 572 disposed between a noise induction layer 560 and a conductive shield layer 594 of an antenna module 500. For example, a capacitance value for noise induction between a conductive member 550 and the conductive shield layer 594 may be determined based on a dielectric constant of a dielectric layer including the noise induction layer 560 and the thermal conduction member 572. According to an embodiment, the thermal conduction member 572 may include a thermal interface material (TIM). In an embodiment, the electronic device 700 may further include a thermal conduction material disposed between the noise induction layer 560 and the conductive shield layer 594 and/or between the conductive member 550 and a conductive part 721 of a housing 710. According to an embodiment, the thermal conduction material may include a thermal pad, a thermal paste and/or thermal grease.

Figure 10A:
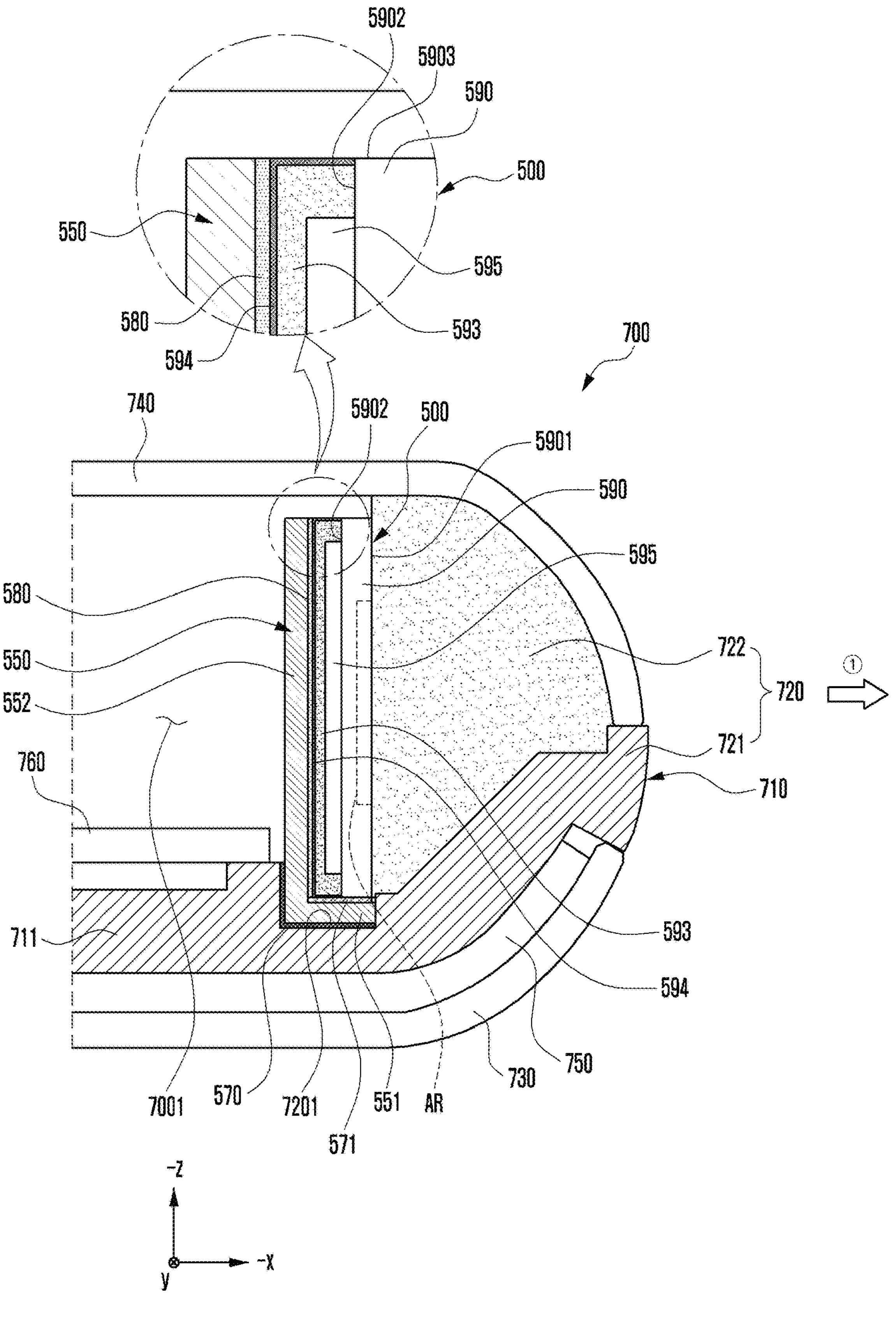
FIG. 10A is a cross-sectional view of a part of an electronic device including a tape member for noise induction according to various embodiments.
Figure 10B:
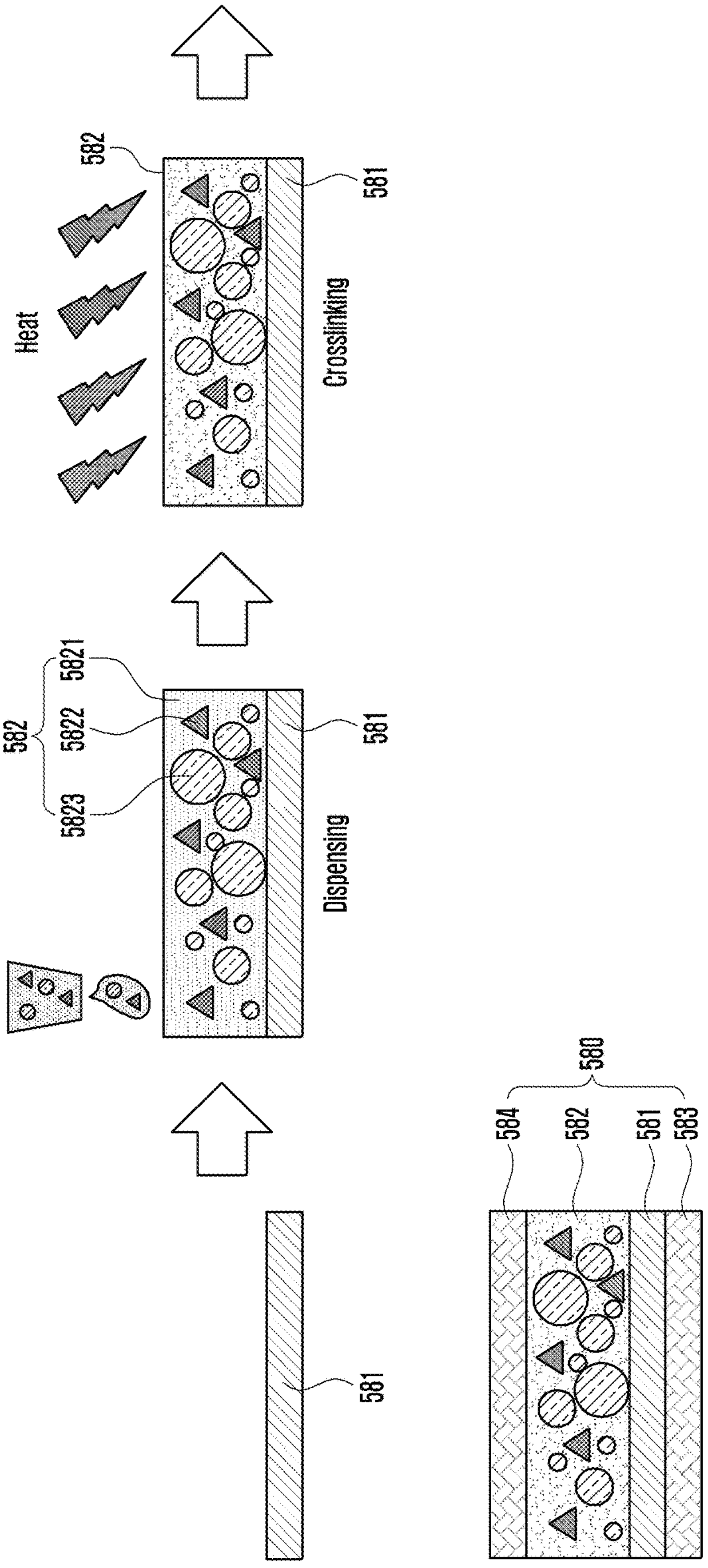
FIG. 10B is a diagram illustrating an example process of fabricating the tape member for noise induction according to various embodiments.

FIG. 10A is a cross-sectional view of a part of an electronic device including a tape member for noise induction according to various embodiments. FIG. 10B is a diagram illustrating an example process of fabricating the tape member for noise induction according to various embodiments.

In describing an electronic device 700 of FIG. 10A, substantially the same elements as those of the electronic device 700 of FIG. 8A are assigned the same reference numerals, and a detailed description thereof may not be repeated here.

Referring to FIGS. 10A and 10B, the electronic device 700 may include a noise induction member 580 (e.g., a noise induction layer) disposed between a conductive member 550 and a conductive shield layer 594 of an antenna module 500. According to an embodiment, the noise induction member 580 may be disposed in the form of a tape attached to at least a part of (e.g., a second support 551 or a first support 551 and the second support 552) of the conductive member 550. For example, the noise induction member 580 may be attached to the conductive member 550 through an adhesive member, such as a double-sided tape. According to an embodiment, the noise induction member 580 may include a first conductive film 583 including a metal sheet 581, a second conductive film 584, and a dielectric layer 582 disposed between the first conductive film 583 and the second conductive film 584. According to an embodiment, the dielectric layer 582 may be formed to have a capacitor structure through the first conductive film 583 and the second conductive film 584 attached to both sides of the dielectric layer

582 in the state in which a dielectric having a liquid form in which a high dielectric material 5822 and a thermal conductive material 5823 have been mixed with resin 5821 at a designated ratio is coated on the metal sheet 581 (e.g., a Cu plate) and then hardened through thermal curing. According to an embodiment, the first conductive film 583 and the second conductive film 584 may include an anisotropic conductive film (ACF) configured to have conductivity in one direction in response to pressure. In an embodiment, the first conductive film 583 and the second conductive film 584 may include a common conductive tape. In an embodiment, the metal sheet 581 may be omitted. In such a case, the dielectric having the liquid form may be directly coated on the first conductive film 583.

According to various embodiments, the dielectric layer 582 may include the high dielectric material 5822 (e.g., the high dielectric material 562 in FIG. 6B) mixed with the resin 5821 (e.g., the resin 561 in FIG. 6B) at a designated ratio. According to an embodiment, the dielectric layer 582 may include the thermal conductive material 5823 (e.g., the thermal conductive material 563 in FIG. 6B) mixed at a designated ratio in addition to the high dielectric material 5822. According to an embodiment, the high dielectric material 5822 may include at least one of barium titanate (BaTiO3), Pb-series perovskite or carbon black. According to an embodiment, the thermal conductive material 5823 may include at least one of aluminum oxide ($Al_2O_3$), aluminum nitride (AlN), boron nitride (BN) or silicon carbide (SiC). According to an embodiment, the noise induction member 580 having the capacitor structure may be formed to have a capacitance value having a range of about 43 pF to about 57 pF through the adjustment of content of the high dielectric material 5822. According to an embodiment, the mixed ratio of the resin 5821, high dielectric material 5822 and thermal conductive material 5823 of the dielectric layer 582 of the noise induction member 580 may include 1:3:6. For example, content of the high dielectric material 5822 of the dielectric layer 582 of the noise induction member 580 may be determined in a range of about 30 wt % to about 70 wt % in the state in which content of the resin 5821 has been fixed to about 10 wt % based on a total weight. Accordingly, content of the thermal conductive material 5823 may be determined in a range of about 20 wt % to about 60 wt %.

Figure 10C:
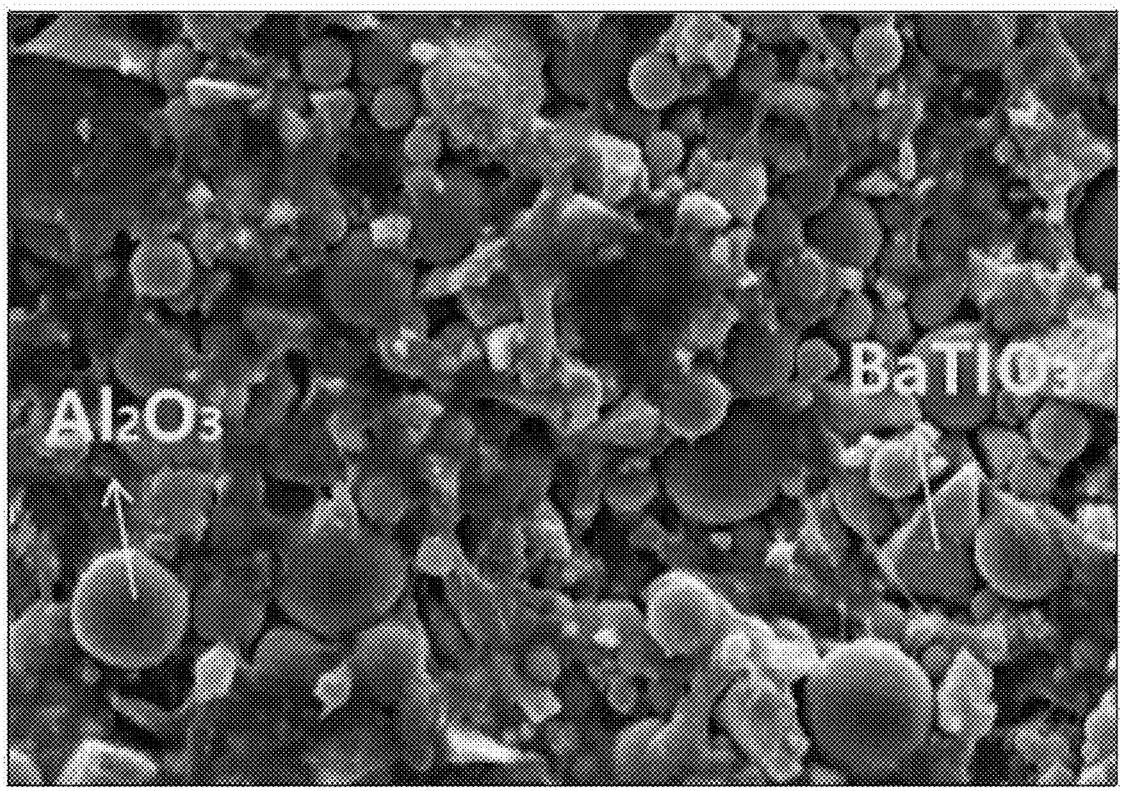
FIG. 10C is an enlarged view of a dielectric layer in which a dielectric material and a thermal conductive member are mixed with resin according to various embodiments.

FIG. 10C is an enlarged view of the dielectric layer 582 of the noise induction member 580 in FIG. 10B in which the high dielectric material and the thermal conductive member are mixed with the resin according to various embodiments. For example, FIG. 10C illustrates the state in which barium titanate (BaTiO3) as the high dielectric material 5822 and aluminum oxide ($Al_2O_3$) as the thermal conductive material 5823 are mixed through the resin 5821. According to an embodiment, particles of the high dielectric material 5822 and the thermal conductive material 5823 may be selected based on a Horsfield's packing model and an average particle diameter distribution of the selected particles may be adjusted. Accordingly, the particle packing of the thermal conductive material can be made dense, thus being capable of helping improving perpendicular thermal conductivity (e.g., improving a heat dissipation function).

According to various example embodiments, an electronic device (e.g., the electronic device 700 in FIG. 7B) may include: a housing (e.g., the housing 710 in FIG. 7B) including a conductive part (e.g., the conductive part 721 in FIG. 7B); an antenna module, including a substrate (e.g., the substrate 590 in FIG. 7B) including a first substrate surface (e.g., the first substrate surface 5901 in FIG. 7B), a second substrate surface (e.g., the second substrate surface 5902 in FIG. 7B) facing a direction opposite the direction of the first substrate surface, and a substrate side (e.g., the substrate side 5903 in FIG. 7B) surrounding a space between the first substrate surface and the second substrate surface, at least one antenna element (e.g., the antenna elements 510, 520, 530, and 540 in FIG. 5A) disposed in the substrate, wireless communication circuitry (e.g., the wireless communication circuitry 595 in FIG. 7B) disposed in the substrate and configured to transmit and/or receive a radio signal in the direction toward which the first substrate surface faces through the at least one antenna element, a protection member (e.g., the protection member 593 in FIG. 7B) comprising a dielectric material disposed on the second substrate surface, and a conductive shield layer (e.g., the conductive shield layer 594 in FIG. 7B) disposed on at least an external surface of the protection member, as an antenna module (e.g., the antenna module 500 in FIG. 7B) disposed in an internal space (e.g., the internal space 7001 in FIG. 7B) of the housing; a conductive member (e.g., the conductive member 550 in FIG. 7B) comprising a conductive material disposed in at least a part of the conductive part and having at least a partial area thereof facing at least a part of the conductive shield layer; and a noise induction layer (e.g., the noise induction layer 560 in FIG. 7B) disposed between the antenna module and the conductive member to form a capacitor structure having a specified capacitance value between the conductive shield layer and the conductive member. Noise induced from the antenna module may be induced toward the conductive part through the capacitor structure.

According to various example embodiments, the noise induction layer may include a dielectric material mixed with resin at a specified ratio. The capacitance value may be determined based on content of the dielectric material.

According to various example embodiments, the content of the high dielectric material may be in a range of 30 wt % to 70 wt % based on a total weight of the noise induction layer.

According to various example embodiments, the noise induction layer may be hardened after the resin having a liquid form including the high dielectric material is coated on the conductive member.

According to various example embodiments, the high dielectric material may include at least one of barium titanate (BaTiO3), Pb-series perovskite or carbon black.

According to various example embodiments, the noise induction layer may further include a thermal conductive material mixed with the resin at a specified ratio.

According to various example embodiments, the thermal conductive material may include at least one of aluminum oxide ($Al_2O_3$), aluminum nitride (AlN), boron nitride (BN) or silicon carbide (SiC).

According to various example embodiments, a mixed ratio of the high dielectric material and the thermal conductive material may be about 6:1.

According to various example embodiments, the capacitor structure through the noise induction layer may be configured to have a capacitance value having a range of about 43 pF to 57 pF.

According to various example embodiments, the noise induction layer may be configured to have a withstand voltage of at least 350 V dc.

According to various example embodiments, the noise induction layer may be configured to have hardness of at least 4H.

According to various example embodiments, the conductive member may include: a first support corresponding to the substrate side and a second support extended to be bent from the first support and corresponding to the second substrate surface. The noise induction layer may be disposed between the conductive shield layer and the second support.

According to various example embodiments, the electronic device may further include an insulating member comprising an insulating material disposed between the substrate side and the first support.

According to various example embodiments, the electronic device may further include a thermal conduction member (TIM) disposed between the conductive part and the conductive member.

According to various example embodiments, the electronic device may further include a thermal pad, a thermal paste and/or thermal grease coated between the conductive member and the conductive part and/or between the conductive member and the conductive shield layer.

According to various example embodiments, the housing may include a first face, a second face facing a direction opposite a direction of the first face, and a side portion at least partially surrounding the internal space between the first face and the second face. The antenna module may be disposed to form a beam pattern through a non-conductive part at least partially disposed in the side portion.

According to various example embodiments, the electronic device may further include a display disposed to be visible from an outside through at least a part of the first substrate face in the internal space.

According to various example embodiments, the noise induction layer may include a first conductive film; a second conductive film; and a dielectric layer disposed between the first conductive film and the second conductive film. The dielectric layer may include a dielectric material mixed with resin at a designated ratio.

According to various example embodiments, the dielectric layer may further include a thermal conductive material mixed with the resin at a designated ratio.

According to various example embodiments, the noise induction layer may be attached to at least a part of the conductive member through an adhesive.

Various example embodiments disclosed herein and drawings have presented various examples in order to describe the technological contents and to aid in understanding the present disclosure, but are not intended to limit the scope of the disclosure. Accordingly, the scope of the present disclosure should be understood as including all changes or modified forms derived based on the technical spirit and scope of the present disclosure in addition to the disclosed embodiments, including the appended claims and their equivalents.

What is claimed is:

1. An electronic device comprising:
- a housing comprising a conductive part;
- an antenna module, comprising:
  - a substrate comprising a first substrate surface, a second substrate surface facing a direction opposite a direction of the first substrate surface, and a substrate side surrounding a space between the first substrate surface and the second substrate surface,
  - at least one antenna element disposed in the substrate,
  - wireless communication circuitry disposed in the substrate and configured to transmit or receive a radio signal in a direction toward which the first substrate surface is directed through the at least one antenna element,
  - a protection member disposed on the second substrate surface, and
  - a conductive shield layer disposed on an external surface of the protection member, such that the antenna module is disposed in an internal space of the housing;
- a conductive member disposed in a part of the conductive part and having a partial area thereof facing a part of the conductive shield layer; and
- a noise induction layer disposed between the antenna module and the conductive member to form a capacitor structure having a specified capacitance value between the conductive shield layer and the conductive member,
- wherein the capacitor structure is configured to induce noise from the antenna module toward the conductive part therethrough.

2. The electronic device of claim 1, wherein:
- the noise induction layer comprises a dielectric material mixed with resin at a specified ratio, and
- the capacitance value is determined based on content of the dielectric material.

3. The electronic device of claim 2, wherein the content of the high dielectric material is in a range of 30 wt % to 70 wt % based on a total weight of the noise induction layer.

4. The electronic device of claim 2, wherein the noise induction layer comprises a hardened layer hardened after the resin having a liquid form comprising the dielectric material is coated on the conductive member.

5. The electronic device of claim 2, wherein the dielectric material comprises at least one of barium titanate ($BaTiO_3$), Pb-series perovskite or carbon black.

6. The electronic device of claim 2, wherein the noise induction layer further comprises a thermal conductive material mixed with the resin at a specified ratio.

7. The electronic device of claim 6, wherein the thermal conductive material comprises at least one of aluminum oxide ($Al_2O_3$), aluminum nitride (AlN), boron nitride (BN) or silicon carbide (SiC).

8. The electronic device of claim 6, wherein a mixed ratio of the dielectric material to the thermal conductive material is 6 : 1.

9. The electronic device of claim 1, wherein the capacitor structure formed by the noise induction layer is configured to have a capacitance value having a range of 43 pF to 57 pF.

10. The electronic device of claim 1, wherein the noise induction layer is configured to have a withstand voltage of at least 350 V dc.

11. The electronic device of claim 1, wherein the noise induction layer is configured to have hardness of at least 4H.

12. The electronic device of claim 1, wherein the conductive member comprises:
- a first support corresponding to the substrate side; and
- a second support extended to be bent from the first support and corresponding to the second substrate surface,
- wherein the noise induction layer is disposed between the conductive shield layer and the second support.

13. The electronic device of claim 12, further comprising an insulating member disposed between the substrate side and the first support.

14. The electronic device of claim 1, further comprising a thermal conduction member (TIM) disposed between the conductive part and the conductive member.

15. The electronic device of claim 1, further comprising a thermal pad, a thermal paste and/or thermal grease coated between the conductive member and the conductive part and/or between the conductive member and the conductive shield layer.

16. The electronic device of claim 1, wherein:

the housing comprises a first face, a second face facing a direction opposite to a direction of the first face, and a side member at least partially surrounding the internal space between the first face and the second face, and the antenna module is disposed to form a beam pattern through a non-conductive part at least partially disposed in the side member.

17. The electronic device of claim 16, further comprising a display disposed to be visible from an outside through at least a part of the first face in the internal space.

18. The electronic device of claim 1, wherein the noise induction layer comprises:

a first conductive film;

a second conductive film; and a dielectric layer disposed between the first conductive film and the second conductive film, wherein the dielectric layer comprises a dielectric material mixed with resin at a specified ratio.

19. The electronic device of claim 18, wherein the dielectric layer further comprises a thermal conductive material mixed with the resin at a specified ratio.

20. The electronic device of claim 18, wherein the noise induction layer is attached to at least a part of the conductive member through an adhesive.

* * * * *